United States Patent
Sztuk et al.

(10) Patent No.: US 11,132,056 B2
(45) Date of Patent: Sep. 28, 2021

(54) PREDICTIVE EYE TRACKING SYSTEMS AND METHODS FOR FOVEATED RENDERING FOR ELECTRONIC DISPLAYS

(71) Applicant: Facebook Technologies, LLC, Menlo Park, CA (US)

(72) Inventors: Sebastian Sztuk, Menlo Park, CA (US); Javier San Agustin Lopez, Menlo Park, CA (US); Steven Paul Lansel, East Palo Alto, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 55 days.

(21) Appl. No.: 16/703,649

(22) Filed: Dec. 4, 2019

(65) Prior Publication Data

US 2021/0173474 A1    Jun. 10, 2021

(51) Int. Cl.
| | |
|---|---|
| *G06F 3/01* | (2006.01) |
| *G02B 27/00* | (2006.01) |
| *G02B 27/01* | (2006.01) |
| *G06T 19/00* | (2011.01) |

(52) U.S. Cl.
CPC ......... *G06F 3/013* (2013.01); *G02B 27/0093* (2013.01); *G02B 27/0172* (2013.01); *G02B 27/0189* (2013.01); *G06T 19/006* (2013.01); *G02B 2027/011* (2013.01); *G02B 2027/0187* (2013.01)

(58) Field of Classification Search
CPC ... G06F 3/013; G02B 27/0093; G02B 7/0172; G02B 7/0189; G06T 19/006
USPC .......................................................... 348/78
See application file for complete search history.

(56) References Cited

U.S. PATENT DOCUMENTS

| | | |
|---|---|---|
| 10,140,695 B2 | 11/2018 | Wilson et al. |
| 2017/0358136 A1 | 12/2017 | Gollier et al. |
| 2018/0239145 A1 | 8/2018 | Lanman et al. |

(Continued)

FOREIGN PATENT DOCUMENTS

WO    2017-025487 A1    2/2017

OTHER PUBLICATIONS

Konrad, Robert et al.; "Depth Cues in VR Head Mounted Displays with Focus Tunable Lenses," Standford University, published Aug. 2015, retrieved from the Internet Sep. 4, 2019.

(Continued)

*Primary Examiner* — On S Mung
(74) *Attorney, Agent, or Firm* — McDermott Will & Emery LLP

(57) ABSTRACT

Various aspects of the subject technology relate to prediction of eye movements of a user of a head-mountable display device. Predictive foveated display systems and methods, using the predicted eye movements are also disclosed. Predictive variable focus display systems and methods using the predicted eye movements are also disclosed. Predicting eye movements may include predicting a future gaze location and/or predicting a future vergence plane for the user's eyes, based on the current motion of one or both of the user's eyes. The predicted gaze location may be used to pre-render a foveated display image frame with a high-resolution region at the predicted gaze location. The predicted vergence plane may be used to modify an image plane of a display assembly to mitigate or avoid a vergence/accommodation conflict for the user.

20 Claims, 17 Drawing Sheets

(56) References Cited

U.S. PATENT DOCUMENTS

2019/0339770 A1* 11/2019 Kurlethimar ......... G06F 3/0346
2019/0354173 A1 11/2019 Young et al.

OTHER PUBLICATIONS

Kramida, Gregory et al.; "Resolving the Vergence-Accommodation Conflict in Head Mounted Displays," University of Maryland, published 2015, retrieved from the Internet Sep. 4, 2019.
Vishwanath, Dhanraj et al.; "Retinal blur and the perception of egocentric distance", Journal of Vision (2010) 10(10):26, 1-16.
EPO—International Search Report and Written Opinion for related International Appln. No. PCT/US2020/058436 dated Jan. 29, 2021—8 pgs.

* cited by examiner

PREDICTIVE EYE TRACKING SYSTEMS AND METHODS FOR FOVEATED RENDERING FOR ELECTRONIC DISPLAYS

BACKGROUND

Field

The present disclosure generally relates to display systems for immersive viewing and, more particularly, to predictive eye tracking for head-mountable display devices.

Description of the Related Art

Head-mounted displays (HMDs) can include display panels such as liquid crystal display panels, light-emitting diode display panels, or wave guide displays that can be used to display virtual reality, augmented reality, or mixed reality environments to a user. For example, stereoscopic images can be displayed on an electronic display inside the headset to simulate the illusion of depth. Head tracking sensors and eye tracking sensors can be used to estimate what portion of the virtual environment is being currently viewed by the user, to determine which portion of the environment to present on the display. However, challenges can arise when presenting simulated three-dimensional content that changes with the changing head and eye position of the user.

For example, such a simulation can, in some circumstances, cause visual fatigue and nausea resulting from an inability of existing headsets to correctly render or otherwise compensate for vergence and accommodation conflicts. HMDs with advanced display features, such as variable focus display features, have been proposed to address these vergence and accommodation issues.

As another example, conventional displays present images at a constant resolution. In contrast, resolution varies across a retina of a human eye. Though the eye receives data from a field of about 200 degrees, the acuity over most of that range is poor. In fact, the light must fall on the fovea to form high resolution images, and that limits the acute vision angle to about 15 degrees. In head-mounted displays, at any given time, only a small portion of the image light emitted from the display is actually imaged onto the fovea. The remaining image light that is imaged onto the retina is imaged at other areas that are not capable of perceiving the high resolution in the emitted image light. Accordingly, some of the resources (e.g., power, memory, processing time, etc.) that went into generating the high resolution image being viewed by the user is wasted as the user is not able to perceive the portion of the image light imaged outside the fovea at its full resolution. HMDs with advanced display features, such as foveated display features, have been proposed to address these inefficiency issues.

However, it can be additionally challenging to integrate the operations of advanced display features, such as variable focus display features and foveated display features, with other portions of a display pipeline, from content generation to content display.

SUMMARY

The present disclosure provides head-mountable display systems with predictive eye tracking. The predictive eye tracking systems and methods disclosed herein can be particularly useful in providing predictive variable focus systems and/or predictive foveated display systems for head-mountable display devices, including for displaying virtual reality, augmented reality, and/or mixed reality content.

According to some aspects of the present disclosure, a head-mountable display system, is disclosed that includes a head-mountable display device, including a housing; a display panel within the housing; and one or more eye tracking units configured to obtain eye tracking data; an eye tracking module configured to identify a change in a current gaze location, based on the eye tracking data; an eye prediction module configured to generate a predicted future gaze location based on the identified change; and processing circuitry configured to render, for display by the display panel, at least one predictive foveated display image frame based on the predicted future gaze location.

According to some aspects of the present disclosure, a method is disclosed, the method including obtaining eye tracking data for a user of a head-mountable display device having a display panel; determining a current gaze location and a current direction and speed of a change in the current gaze location, based on the eye tracking data; generating a predicted future gaze location based on the current direction and speed; rendering, for display by the display panel, a current foveated display image frame based on the current gaze location; and pre-rendering, for display by the display panel subsequent to display of the current foveated display image frame, at least one predictive foveated display image frame based on the predicted future gaze location.

According to some aspects of the present disclosure, a method is disclosed for operating a head-mountable display system having a head-mountable display device that includes a display panel, an optical block configured to focus display light from the display panel, and left and right eye tracking units. The method includes obtaining, with an eye prediction module of the head-mountable display system, eye tracking data from the left and right eye tracking units; determining a type of eye movement with the eye prediction module using the eye tracking data; and generating, with the eye prediction module using the eye tracking data and the determined type of eye movement, at least one of a predicted future gaze location or a predicted future vergence plane.

According to some aspects of the present disclosure, a head-mountable display device is disclosed that includes a housing; a display assembly within the housing, the display assembly including a display panel; an optical block including at least one optical element configured to focus display light from the display panel; and one or more eye tracking units configured to obtain eye tracking data; an eye tracking module configured to identify an eye movement, based on the eye tracking data; an eye prediction module configured to generate a predicted future vergence plane based on the identified eye movement; and a varifocal actuation block configured to adjust at least one of the display panel or a component of the optical block based on the predicted future vergence plane.

According to some aspects of the present disclosure, a method is disclosed that includes obtaining eye tracking data for a user of a head-mountable display device having a display panel and an optical block for the display panel; determining a current direction and speed of an eye movement, based on the eye tracking data; generating a predicted future vergence plane based on the current direction and speed of the eye movement; and adjusting at least one of the display panel or a component of the optical block based on the predicted future vergence plane.

According to some aspects of the present disclosure, a method is disclosed for operating a head-mountable display system having a head-mountable display device that includes a display panel, an optical block configured to focus display light from the display panel, and left and right eye tracking units. The method includes obtaining, with an eye prediction module of the head-mountable display system, eye tracking data from the left and right eye tracking units; determining, with the eye prediction module: a first predicted gaze location based on the eye tracking data and a saccade model of an eye movement, a second predicted gaze location based on the eye tracking data and a smooth-pursuit model of the eye movement, a third predicted gaze location based on the eye tracking data and a vestibulo-ocular model of the eye movement, and a predicted vergence plane based on the eye tracking data and a vergence model of the eye movement.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
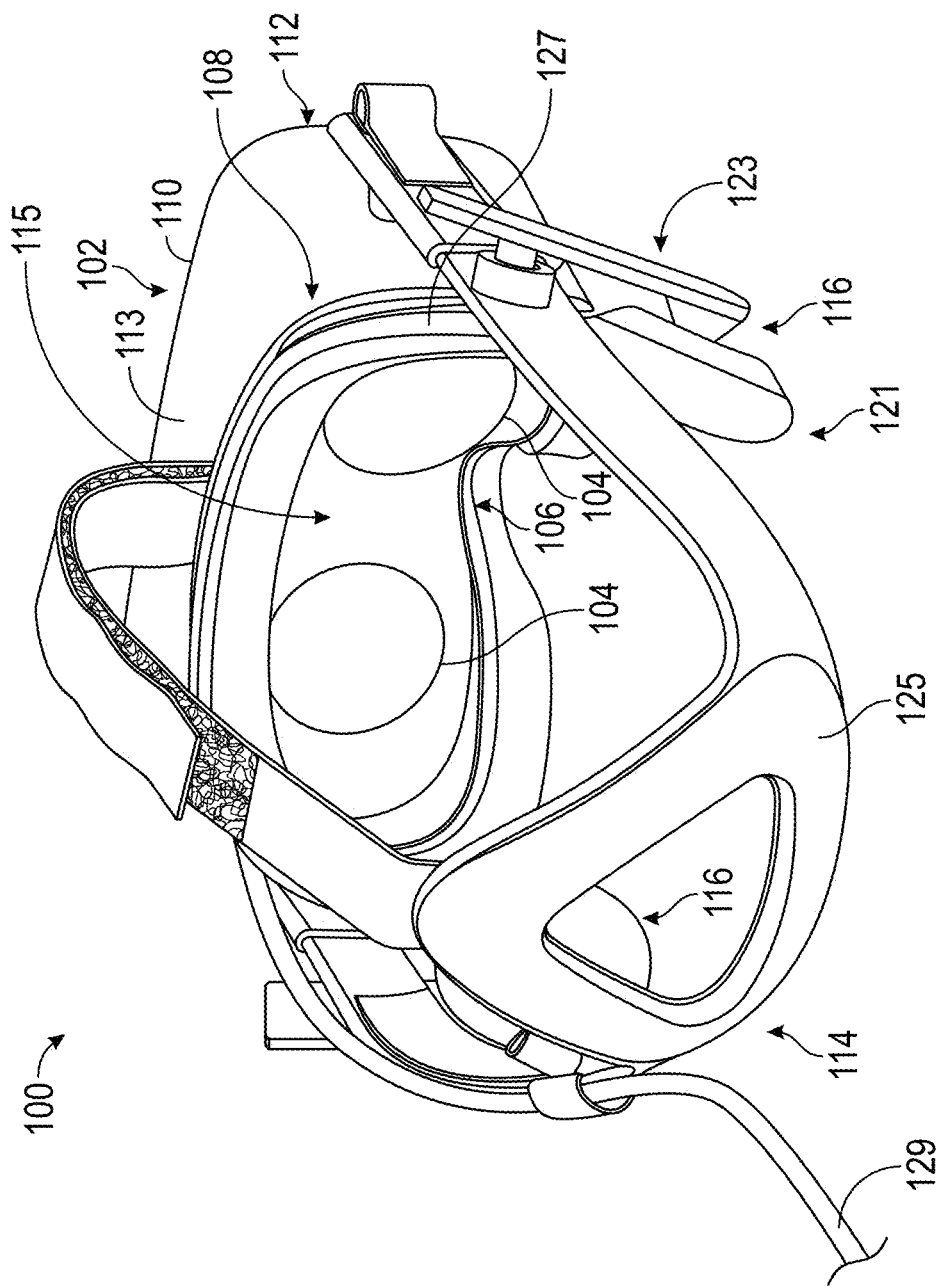
FIG. 1 illustrates a perspective view of a head-mountable display device, in accordance with aspects of the disclosure.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Head-mountable display devices can include individual display panels, or individual portions of a display panel, that are visible to the individual eyes of a user, when the head-mountable display device is worn by the user. For example, a left-eye lens and a right-eye lens may be mounted in a housing of the device to focus light from a left-eye display pixel array and a right-eye display pixel array, respectively, into the left and right eyes of the user.

In order to save energy and processing complexity when displaying image frames to the user with the display panel(s), the display pixels of the display panels can be operated in a foveated display mode. In a foveated display mode, the display pixels in a region around the gaze location of the user (e.g., a high-resolution region) display a high-resolution portion of an image frame. Because the user's vision cannot perceive such a high resolution outside of the central (fovea) portion of their field of view, the display pixels of a surrounding region display a lower-resolution version of the image frame in that region. A transition region between the high-resolution region and the surrounding region can also be provided.

By tracking the gaze location of the user's eyes, portions of the display panel(s) corresponding to the high-resolution portions of an image can move with the motion of the user's eyes. However, it can be particularly disruptive and/or disorienting to the user if the high-resolution region of the display is not located at the current gaze location of the user. Moreover, it can take time to complete all portions of a display pipeline (e.g., from tracking operations, to content identification and/or generation, to rendering), which can make it difficult to display the high-resolution region at the correct gaze location when (or before) the eyes settle on a fixation.

Accordingly, gaze prediction systems and methods are described herein, by which a predicted gaze location can be determined. The size, shape, location, and/or other features of the high-resolution region, transition region, and/or surrounding regions can be adjusted based on the predicted gaze location, to help ensure that the user's eye is always gazing on a high-resolution portion of the display. The size and/or shape of the high-resolution (e.g., foveate) region can also dynamically change (e.g., as the prediction model builds confidence), as described in further detail hereinafter. Gaze prediction systems and methods, and predictive foveated display systems and methods based on gaze predictions, are described in further detail hereinafter.

To make a displayed object appear at different distances, the position of the displayed object for each eye of the user can be changed. For example, to make an object appear to move away from the user, copies of the object being displayed, individually, to the left and right eyes of the user can be moved away from each other. Similarly, to make an object appear to move toward the user, the copies of the object being displayed, individually, to the left and right eyes of the user can be moved toward each other. These movements of the copies of the object image cause the user's eyes to individually follow that copy, and thereby diverge or converge, causing the impression of three-dimensional motion. The user can also choose to look at various objects at various virtual distances, having various lateral distances (along the display plane) between the left and right copies of that object being displayed to the user's left and right eyes.

However, each of the two displayed copies of each object is displayed in focus at an image plane for each eye. The distance of the image plane is determined by the arrangement of the optical system and the display assembly (e.g., by the arrangement of a display panel such as a liquid crystal display panel, a light-emitting diode display panel, or a wave-guide display and/or the size, shape, and/or position of one or more lenses arranged to guide, focus, and/or redirect display light, or by the control of the components of a liquid crystal optics system, a multifocal system, and/or a light-field display), and may be different than the apparent depth of the object caused by the lateral distance between the two copies of the object displayed to each eye. Accordingly, each eye of the user may be focused at the image plane, or may be unable to focus on the image plane, regardless of the perceived three-dimensional position or movement of the displayed object. Without adjustment of the focus of the user's eyes (e.g., caused by an adjustment of the depth of the image plane) when the vergence of the user's eyes changes, a vergence-accommodation conflict can cause user fatigue and/or dizziness. For large vergence-accommodation conflicts, the user's eye may not even be able to focus on the image plane, which results in a displayed image appearing blurred. To alleviate these vergence-accommodation conflicts, the position, shape, or other aspects of one or more optical elements such as lenses, multifocal liquid crystal optical components, and/or the position and/or configuration of the display panel (as examples), can be modified to move the image plane and thereby cause the user's focus to also change in coordination with the changing vergence.

In some circumstances, it may not be practical or feasible to move the image plane all the way to the actual virtual distance of all objects in an artificial reality display. Thus, a zone of comfort can be defined, for each vergence plane, within which the image plane can be placed, to provide a comfortable viewing experience for the user. For example, the zone of comfort way extend to +/−2 diopters perpendicularly to the vergence plane.

By moving the image plane toward and/or into the zone of comfort corresponding to a particular vergence plane, the adjustment of the display assembly optical component(s) causes an accommodation change in the user's eyes in a direction consistent with the direction of the vergence change, thus relieving and/or preventing the fatiguing or dizzying sense of conflict when the vergence changes, but focus (accommodation) does not.

However, it takes time to adjust (e.g., move, change the shape, or otherwise adjust) elements of the display assembly to move the image plane. Because the user may be viewing a dynamic scene, and/or dynamically looking around a static scene, it is desirable to minimize time for the display assembly to respond to vergence changes, so that the display assembly response is performed in time to provide a benefit to the user before a next vergence change.

Accordingly, vergence prediction systems and methods are described herein, by which a predicted vergence plane and/or zone of comfort can be determined. The image plane generated by the display panel and corresponding optics can be adjusted in advance of the user completing a movement to a new vergence plane, based on the predicted vergence. In this way, vergence prediction systems and methods disclosed herein can help reduce or minimize the time between the user's eyes landing at a vergence plane, and the focus of the virtual image plane landing within the zone of comfort corresponding to that vergence plane. Vergence prediction systems and methods, and predictive variable focus display systems and methods based on vergence predictions, are described in further detail hereinafter.

Example Head-Mountable Display System

FIG. 1 illustrates an example head-mountable display system 100, in accordance with aspects of the disclosure. As shown in FIG. 1 head-mountable-display system 100 may include a head-mountable display device 102, a facial-interface system 108, a strap assembly 114, and audio subsystems 116. A head-mountable display device may include any type or form of display device or system that is worn on or about a user's head and displays visual content to the user. Head-mountable display devices may display the visual content in any suitable manner, including via a display panel (e.g., an LCD or LED display panel), a projector, a cathode ray tube, an optical mixer, etc. Head-mountable display devices may display content in one or more of various media formats. For example, a head-mountable display device may display video, photos, and/or computer-generated imagery (CGI).

In the example of FIG. 1, head-mountable display device 102 includes a display housing 110 within, and/or to, which various components of head-mountable display device 102 can be mounted, including lenses 104 and/or various electronic components, including display components as described herein. Display housing 110 may include a housing back surface 112 and peripheral surfaces 113 substantially surrounding one or more internal components, and an opening 115 surrounding a viewing region 106 at a front side of display housing 110.

Head-mountable display devices such as head-mountable display device 102 may provide diverse and distinctive user experiences. Some head-mountable display devices may provide virtual-reality (VR) experiences (i.e., they may display computer-generated or pre-recorded content to a user and block out the user's view of their real-world surroundings), while other head-mountable displays may provide real-world experiences (i.e., they may display live imagery from the physical world). Head-mountable displays may also provide any mixture of live and virtual content. For example, virtual content may be projected onto a view of physical world (e.g., via optical or video see-through), which may result in augmented reality (AR) or mixed reality (MR) experiences for the user. Head-mountable display devices such as head-mountable display device 102 may be configured to be mounted to a user's head in a number of ways. Some head-mountable display devices may be incorporated into glasses or visors. Other head-mountable display devices may be incorporated into helmets, hats, or other headwear.

Head-mountable display device 102 may include or be implemented in conjunction with an artificial reality system. Artificial reality refers to a user experience of audio, visual, tactile, and/or other sensory output of a device, the output having been created by the device or adjusted by the device relative to the real world, before presentation to a user. Artificial reality can refer to, e.g., a virtual reality (VR), an augmented reality (AR), a mixed reality (MR), a hybrid reality, or some combination and/or derivative thereof. Artificial reality content may include content that is entirely virtual device-generated and/or system-generated content, and/or can include virtual content that is combined with real-world content that is directly viewable by the user (e.g., through a transparent or semitransparent portion of the device) or that is captured by one or more system cameras and displayed to the user by the device.

The artificial reality content may include video, audio, haptic feedback, or some combination thereof, and any of which may be presented in a single channel or in multiple channels (such as stereo video that produces a three-dimensional visual effect to the viewer). Additionally, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mountable display (sometimes referred to as a head-mounted display (HMD) without intending to require that the HMD is currently being worn on a user's head) connected to a host computer system, a standalone HMD, a mobile device or computing system, or any other hardware platform capable of providing artificial reality content to one or more viewers.

Audio subsystems 116 may include speakers 121 mounted to housing 110 (e.g., by extensions 123) and may be integrated with head-mountable display device 102 or formed from separate components that are mounted to the housing or directly attachable to the user's ears. Audio subsystems 116 may provide audio signals to the user's ears in conjunction with or separate from displayed content. Head-mountable-display system 100 may, for example, have two audio subsystems 116 located on the left and right sides of head-mountable-display device 102 to provide audio signals to the user's left and right ears, as shown in FIG. 1.

As shown, head-mountable display device 102 may include a strap assembly 114 that may be used for adjustably mounting head-mountable display device 102 on the user's head. As shown in FIG. 1, strap assembly 114 may include lower straps and/or an upper strap that are coupled to head-mountable display device 102 to adjustably conform to the top and/or sides of the user's head when the user is wearing head-mountable-display system 100. Strap assembly 114 may include a back piece 125 coupled with the upper strap and lower straps to rest against the back of the user's head (e.g., around the user's occipital lobe). In at least one embodiment, the back piece may include an opening that is dimensioned and positioned to securely fit around a back portion (e.g., a portion of the user's occipital bone) of the user's head.

Facial-interface system 108 may be configured to comfortably rest against a region of the user's face, including a region surrounding the user's eyes, when head-mountable-display system 100 is worn by the user. For example, facial-interface system 108 may include an interface cushion 127 that is configured to rest against portions of the user's face (e.g., at least a portion of the user's nasal, cheek, temple, and/or forehead facial regions). Facial-interface system 108 extends around viewing region 106 and can be arranged to allow a user wearing head-mountable display device 102 to look through lenses 104 of head-mountable display device 102 without interference from outside light.

Figure 2:
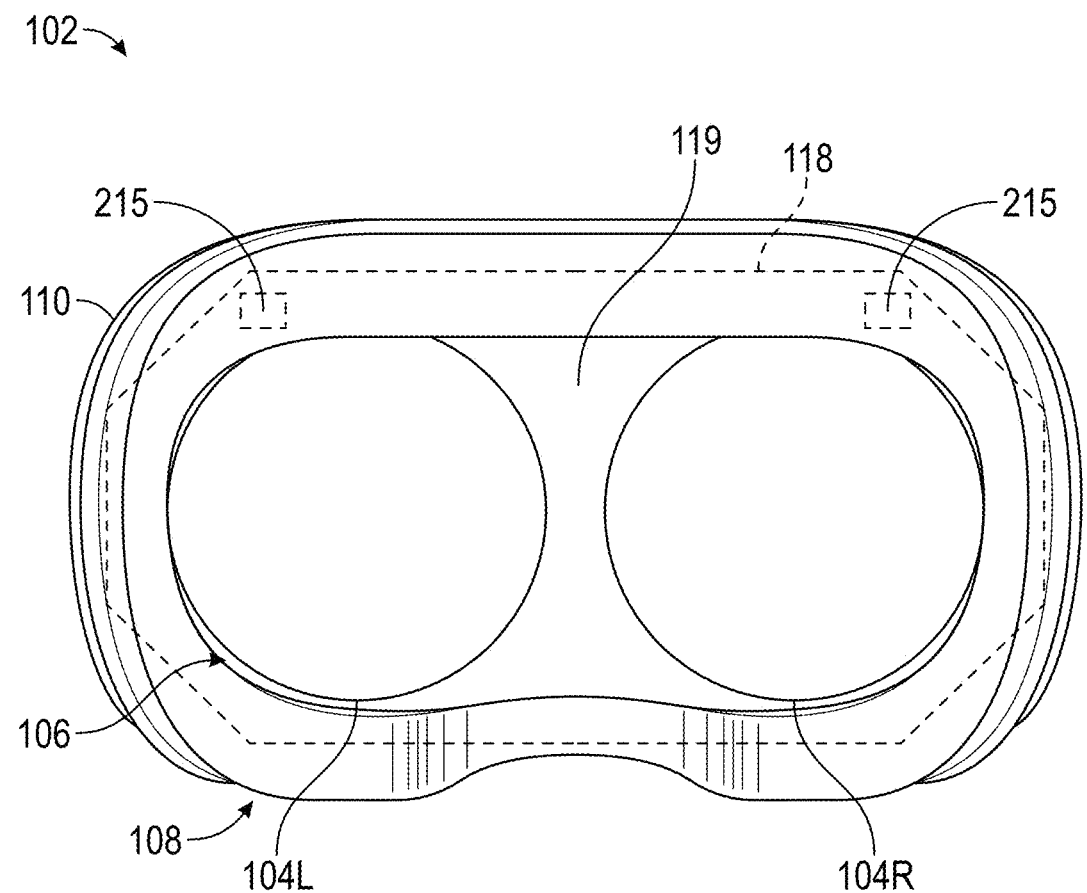
FIG. 2 illustrates a face-on view of the head-mountable display device, in accordance with aspects of the disclosure.

FIG. 2 shows a face-on view of head-mountable display device 102, in accordance with aspects of the disclosure. As indicated in FIG. 2, head-mountable display device 102 may include a display panel 118 disposed within display housing 110. Display panel 118 may be implemented as a liquid crystal display (LCD) panel, a light-emitting diode (LED) display panel or a display panel implementing other display pixel technologies.

As shown in FIG. 2, display panel 118 may be disposed within display housing 110 so as to overlap left-eye lens(es) 104L and right-eye lens(es) 104R, such that images produced by corresponding regions of display panel 118 are visible to a user through left-eye lens(es) 104L and right-eye lens(es) 104R. For example, distinct portions of display panel 118 may be visible to each of the user's eyes, with the distinct portions of the display panel being separated by a dividing region (e.g., portions of separate eye cups for each lens, a central dividing partition, etc.) extending between display panel 118 and a mounting structure for left-eye lens(es) 104L and right-eye lens(es) 104R. Such a configuration may enable distinct images to be presented, by display panel 118, to each of the user's eyes, allowing for three-dimensional content to be perceived by the user. While a single contiguous display panel 118 (a contiguous panel having a display region for each eye of the user) is illustrated in FIG. 2, it should be appreciated that head-mountable display device 102 may be provided with multiple display panels (e.g., one display panels such as one LCD display panel for each eye of the user).

As shown in FIG. 2, head-mountable display device 102 may also include eye tracking units 215 arranged to track the position, orientation, and/or movement of each of the user's eyes, and may also include a light-blocking layer 119 surrounding left-eye lens(es) 104L and right-eye lens(es) 104R. Light-blocking layer 119 may, for example, extend between left-eye lens 104L and right-eye lens 104R and surrounding portions of display housing 110. Light-blocking layer 119 may include, for example, a light-absorbing material (e.g., a dark polymeric and/or fabric material) that masks internal components of head-mountable display device 102 and that prevents any outside light incidentally entering viewing region 106 (e.g., through a gap between the user's face and facial-interface system 108) from being reflected within viewing region 106.

Display housing 110 may be formed from a rigid material, such as a rigid plastic, that supports and protects internal components housed therein, such as display panel 118 and other electronics. At least a portion of display housing 110, such as a portion of display housing 110 surrounding viewing region 106, may include a light-absorbing material that prevents passage of external light and prevents reflection of light incidentally entering viewing region 106. Blocking external light and/or preventing reflection of light in viewing region 106 of head-mountable display device 102 may greatly enhance a user's immersive viewing experience by ensuring that nearly all light visible to the user is emitted from display panel 118. Referring back to FIG. 1, head-mountable display device 102 may be provided with a connecting cable 129 that communicatively couples the head-mountable display device 102 to a remote system such as a remote computing device (e.g., a desktop computer, a tablet, a game console, a server, a dedicated computer, or the like) that generates content to be displayed by display panel 118. However, it should also be appreciated that head-mountable display device 102 may be wirelessly coupled to a remote computing device.

Figure 3:
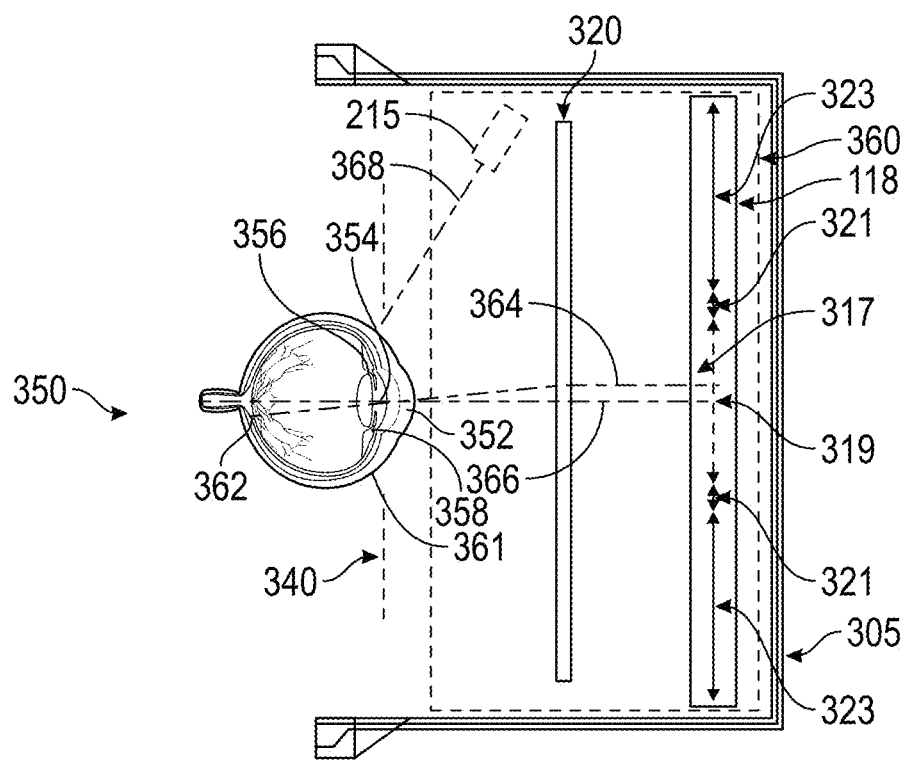
FIG. 3 illustrates a top view of display and eye-tracking elements of a head-mountable display device, in accordance with aspects of the disclosure.

FIG. 3 shows a schematic top view of a portion of head-mountable display device including a portion of a display assembly and display panel for a single eye of a user. In the example FIG. 3, head-mountable display device 102 includes, for each eye of the user, a rigid body 305 (e.g., corresponding to a portion of back surface 112 of housing 110), and a display assembly 360 that includes an optics block 320, and a portion of display panel 118. For purposes of illustration, FIG. 3 shows a cross section of a display assembly 360 associated with a single eye 350. Accordingly, a separate optics block 320 and/or display panel 118, and/or eye tracking unit 215 may be provided in housing 110 for the other eye of the user.

In operation, display pixels of display panel 118 in the example display assembly of FIG. 3 emit display light toward the optics block 320. Optics block 320 may include one or more optical elements including lenses such as lenses 104 of FIGS. 1 and 2, that are arranged, sized, shaped, and positioned, to combine the display light, magnify the display light, and/or correct the display light for one or more additional optical errors (e.g., distortion, astigmatism, etc.). Optics block 320 may include one or more apertures, Fresnel lenses, convex lenses, concave lenses, filters, and so forth, and may include combinations of different optical elements. One or more of the optical elements of optical block 320 may have one or more coatings, such as anti-reflective coatings. Magnification of the display light from display panel 118 by optical block 320 may allow display panel 118 to be physically smaller, weigh less, and consume less power than larger displays. Additionally, magnification of the display light may increase a field of view of the displayed content. For example, the field of view of the displayed content is such that the displayed content is presented using almost all (e.g., 150 degrees diagonal), and in some cases all, of the user's field of view. Optics block 320 directs the display light to an exit pupil 340 for presentation to the eye 350 of a user. The exit pupil 340 is positioned at or near the location of the pupil 354 of the user's eye 350. Although the example of FIG. 3 shows a display panel and an optical block that directs display light from display pixels of the display panel to exit pupil 340, it should be appreciated that other display assembly arrangements can be provided for head-mountable display device 102, such as a display assembly that includes a wave guide display that directs the display light to the exit pupil 340 (e.g., by redirecting display light from a projector, using one or more gratings on a wave guide substrate, to the exit pupil).

As shown in FIG. 3, head-mountable display device 102 may also include one or more eye tracking units 215. Eye tracking unit 215 may include one or more cameras and/or one or more light sources (e.g., infrared light sources) configured for obtaining eye-tracking data corresponding to movement of the eye 350. In one example, infrared light 368 is emitted within head-mountable display device 102 and reflected from each eye 350 of the user. The reflected light is received or detected by the camera and analyzed to extract eye rotation information to identify an eye movement (e.g., by identifying a change in a gaze location such as by determining a direction and speed of the eye movement) from changes in the infrared light reflected by each eye.

As indicated in FIG. 3, the user's eye 350 includes a cornea 352, a pupil 354, a lens 356, an iris 358, a sclera 361, and a fovea 362. The fovea 362 is illustrated as a small indent on the retina. The fovea 362 corresponds to the area of the user's retina which has the highest visual acuity. As indicated in FIG. 3, the angular orientation of the eye 350 corresponds to a direction of the user's gaze toward a gaze location 317 on display panel 118. The gaze direction is defined herein as the direction of a foveal axis 364, which is the axis between a fovea of the eye and a center of the eye's pupil 354, including any modifications or redirections by optics block 320. In general, when a user's eyes are fixed on a point, the foveal axes of the user's eyes intersect that point. The eye also includes a pupillary axis 366, which is the axis passing through the center of the pupil 354, which is perpendicular to the corneal surface 352. In some embodiments, the eye tracking unit 215 detects an orientation of the pupillary axis and estimates the foveal axis 364 based on the detected pupillary axis. Alternately, the eye tracking unit 215 estimates the foveal axis by directly detecting a location of the fovea 362 and/or of other features of the eye's retina.

As described in further detail hereinafter, the image frames displayed on display panel 118 can depend on the position and/or movement of the user's head, as tracked by head-mountable display device 102. For example, as the user moves their head to look around a virtual reality scene, an augmented reality scene, a mixed reality scene, or an artificial reality scene, the portion of the scene corresponding to the position of the display panel in the scene is displayed by the display panel.

In some operational scenarios, display 118 is operated to provide a foveated display of each image frame. In a foveated display, a portion of the image frame around the gaze location 317 is displayed with high resolution. As indicated in FIG. 3, a portion 319 of display panel 118 surrounding the user's gaze location can be used to display the high-resolution portion of the display image. A portion 321 of display panel 118 surrounding the portion 319 displaying the high-resolution portion of the image frame can be used to display a transition region in which the resolution of the displayed image frame decreases with increasing distance from the gaze location 317. A remaining portion 323 of display panel 118 can be used to display a relatively low resolution portion of the image frame.

As the user's gaze location 317 moves around the display panel due to rotation of the user's eye 350, the portions 319, 321, and 323 of display panel 118 that correspond to the high-resolution, transitional, and peripheral portions of the image change accordingly.

Figure 4:
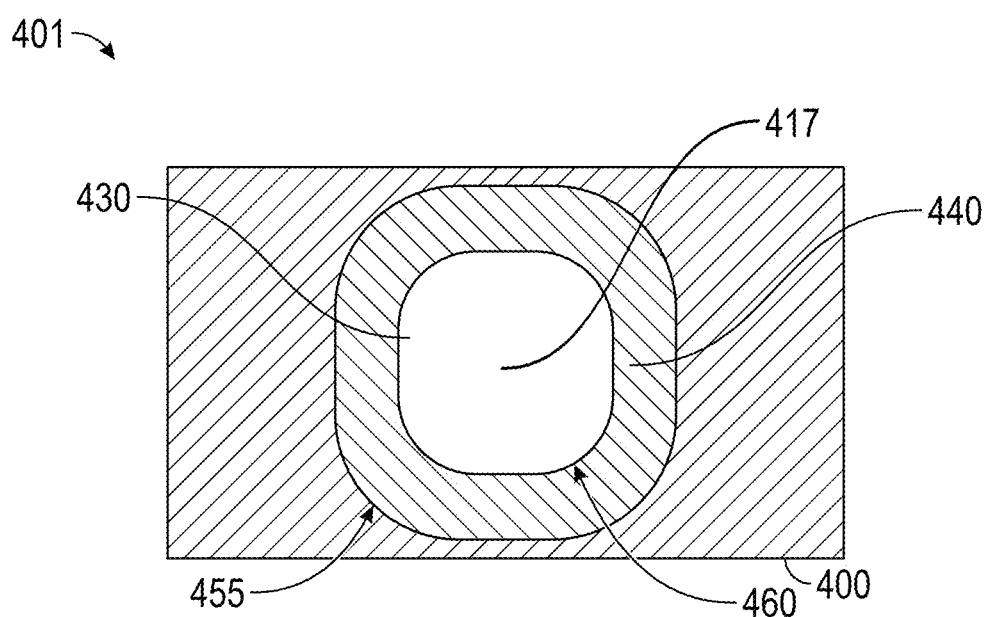
FIG. 4 illustrates various components of a foveated display image, in accordance with aspects of the disclosure.

FIG. 4 illustrates an example of a foveated display image frame that may be displayed using display panel 118. As shown in FIG. 4, a foveated display image frame 401 may include a high-resolution portion 430, a peripheral portion 400, and a transition portion 440 extending between the high-resolution portion and the peripheral portion. High-resolution portion 430, transition portion 440, and peripheral portion 400 may be displayed by portions 319, 321, and 323, respectively, of display panel 118 (noting that the pixels corresponding to these portions 319, 321, and 323 may change with the changing gaze location of the user).

Peripheral portion 400 of image frame 401 may have a resolution that is lower than the resolution of high-resolution portion 430. For example, peripheral portion 400 may have a resolution corresponding to a resolution of a non-fovea region of a human eye. For example, high-resolution portion 430 may be displayed at a resolution corresponding to a foveal region of a human eye.

As shown, transitional portion 440 has an outer boundary 455 and an inner boundary 460 (which are marked in FIG. 4 for clarity of the present description, but would not visible to a user when image 401 is displayed). Transitional portion 440 may be blended such that the resolution smoothly varies from the outer boundary 455 at the resolution of the low resolution portion 400 discussed above, to the high resolution of the high-resolution portion 430 at inner boundary 460. Additionally, the transitional portion 450 may be faded to blend with background portion 400.

In the example of FIG. 4, high-resolution portion 430 has a rectilinear border, centered on the user's gaze location 417, centered within image 401, and with symmetric rounded corners. However, it should be appreciated that, as high-resolution portion 430 moves according to movements of the user's gaze location 317, the location of high-resolution portion 430 (and the surrounding transition portion 440) may move nearer to, or away from, the edges of image 401 (e.g., in a case where the user's gaze location approaches an edge of display panel 118 and/or an edge of their field of view).

It should also be appreciated that the size and shape of high-resolution portion 430 and transitional portion 440 of FIG. 4 are merely illustrative. Other shapes for high-resolution portion 430 and/or transitional portion 440 may include circular shapes, oval shapes, elliptical shapes, elongated rectilinear shapes, or the like, and the shapes may be symmetric as in the example of FIG. 4 or may be asymmetric along one or more dimensions of the display panel (e.g., high-resolution portion 430 and/or transitional portion 440 may be elongated along a direction of movement of the user's eye 305). High-resolution portion 430 and transitional portion 440 may have similar, concentric shapes and positions, or may be differently shaped and/or centered within image 401 (e.g., transitional portion 440 may be elongated along a direction of motion of the user's eye and surround a circular or elongated high-resolution region 430).

In order to display high-resolution region 430 and transition region 440 centered on a current gaze location 317, such that the user does not perceive the reduced resolution in regions 440 and 400, the user's eye is tracked. However, before the foveated display image frame for that gaze location can be displayed to the user, the gaze location is provided to display control circuitry, content associated with the gaze location is identified, display images are rendered, corrected, and/or otherwise processed, and display pixels are operated to display a foveated display image frame 401. Each of these operations (e.g., in addition to other operations such as head tracking and/or received and/or processing user input) take time, making it difficult to complete all operations in real-time tracking with the user's eye. For these reasons, and because it can be particularly disruptive to the user's experience to have the user's gaze location fall on a portion of transition region 440 or low resolution portion 400, it is helpful to have advanced knowledge of the user's gaze location (e.g., so that processing can begin before the user's eye arrives at each gaze location).

In accordance with aspects of the subject disclosure, a predicted gaze location for a future display frame can be obtained, so that a foveated display image frame 401 can be generated in advance (e.g., pre-rendered and/or stored) for that future display frame. Because the future (predicted) gaze locations may not be known with exact certainty, the size and/or shape of high-resolution region 430, transitional region 440, and background portion 400 can be adaptively modified based on, for example, a confidence level for each predicted gaze location, a type of movement of the user's eye 350, and/or other information.

High-resolution region 430, thus, may be centered on a current gaze location or a predicted (e.g., future) gaze location. When high-resolution portion 430 is positioned based on a predicted gaze location, the size and/or shape of high-resolution portion 430, transitional portion 440, and/or background portion 400 may be determined based on the prediction (e.g., based on an amount of time in the future at which the predicted location is expected to be achieved by the user, based on a confidence level associated with the prediction, and/or based on content to be displayed in image 401 at the time at which the predicted location is expected to be achieved by the user). Further details of the gaze location prediction and the modifications to the size and/or shape of portions of a foveated display are described hereinafter.

In addition to the foveated display features described in connection with FIGS. 3 and 4, display assembly 360 may also include components and/or operations for providing variable focus to reduce or prevent undesired effects from vergence/accommodation conflict.

For example, after determining and displaying an image frame (e.g., a foveated display image frame such as image frame 401 of FIG. 4 or a uniform-resolution image frame) corresponding to a portion of an artificial scene being viewed by the user, the system 100 may then determine a location or an object within the determined portion at which the user is looking, and adjust focus for that location or object accordingly. To determine the location or object within the determined portion of the virtual scene at which the user is looking, eye tracking units 215 for each eye may be used to determine the gaze location 317 and/or a vergence plane (e.g., a plane, perpendicular to display panel 118 at which the foveal axes 364 of the user's two eyes intersect).

Eye tracking units 215 may be used to track an eye position, direction, and/or orientation for each eye 350 of the user. For example, head-mountable display device 102 may use eye tracking data from the eye tracking units 215 to track at least a subset of the 3D position, roll, pitch, and yaw of each eye 350 and use eye tracking data including or based on these quantities to estimate the gaze location 317, the vergence plane, and/or a 3D gaze point of each eye. Further, information from past eye positions, information describing a position of the user's head, and information describing a scene presented to the user may also be used to estimate the 3D gaze point of an eye in various embodiments.

Figure 5:
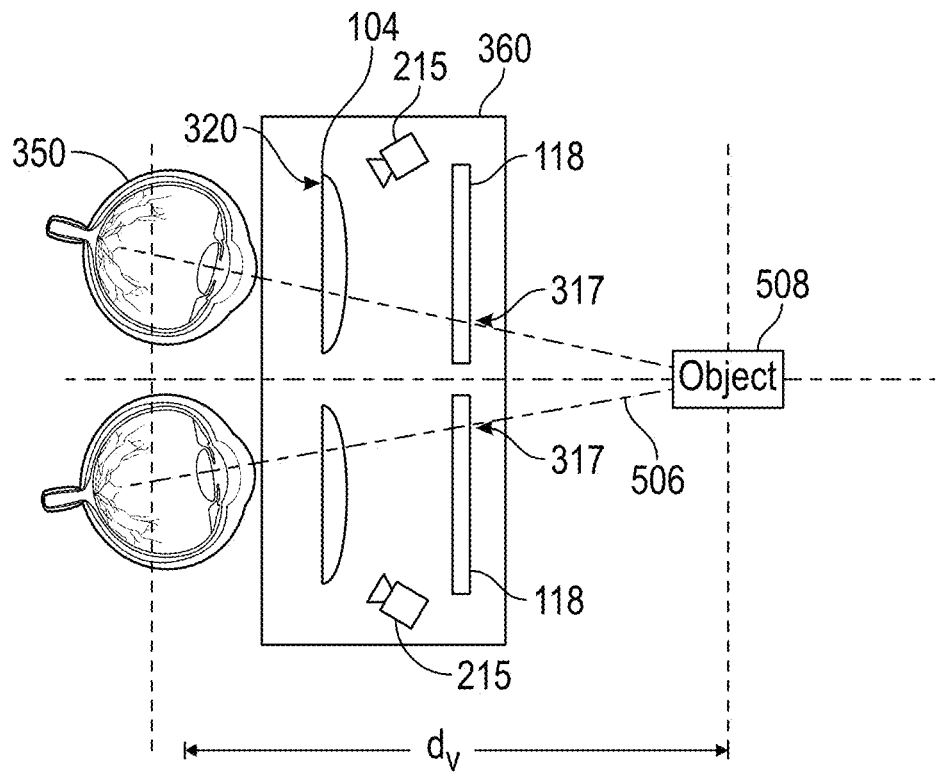
FIG. 5 illustrates a top view of various display and eye-tracking elements, and indicators of vergence aspects associated with a head-mountable display device, in accordance with aspects of the disclosure

For example, FIG. 5 shows an expanded top view of display assembly 360 in which the eye tracking units 215 and display components for both eyes 350 can be seen. In the example of FIG. 5, eye tracking units 215 each include a camera (e.g., including a light source), and display assembly 360 includes lenses 104 (e.g., lenses in lens block 320)

disposed between each eye of the user and individual portions of display panel 118 for each eye 350. Lenses 104 may, for example, form a pancake lens block that includes two or more curved optical elements (e.g., a pair of pancake lenses for each of the user's left and right eyes).

In the example of FIG. 5, eye tracking units 215 capture images of the user's eyes 350 looking at a virtual object 508, displayed at a virtual distance from the user using display panels 118. Head-mountable display device 102 may use eye tracking data from eye tracking units 215 to determine the scene content to be displayed for each eye 350 (e.g., based on a determined gaze location 317 for each eye on display panel 118) and to determine an intersection point for gaze lines 506 (e.g., corresponding to the foveal axis or the pupillary axis as described in FIG. 3). A vergence depth (dv) may be determined based on an estimated intersection of gaze lines 506. The vergence depth may correspond to the virtual depth of virtual object 508. A vergence plane, corresponding to the plane that is parallel to display panel 118 and contains the intersection point of gaze lines 506, may be identified.

In order to change the focal length (or power) of the optical system of head-mountable display device 102, to provide accommodation for the determined vergence depth corresponding to where or what in the displayed portion of the virtual scene the user is looking, one or more components of display assembly 360 can be moved relative to the user's eye 350 and/or relative to other components of the display assembly, based on the determined vergence depth and/or vergence plane. As examples, one or more lenses 104 in a multiple lens block can be moved toward or away from the user's eye or toward or away from another lens in the multiple lens block, one or more of lenses 104 may be deformed to alter the light path through that lens to modify the focal length of the optical system, display panel 118 can be moved toward or away from the user's eye 350 and/or toward or away from lenses 104, and/or lenses 104 may be moved toward or away from the user's eye 350 and/or toward or away from display panel 118.

Figure 6:
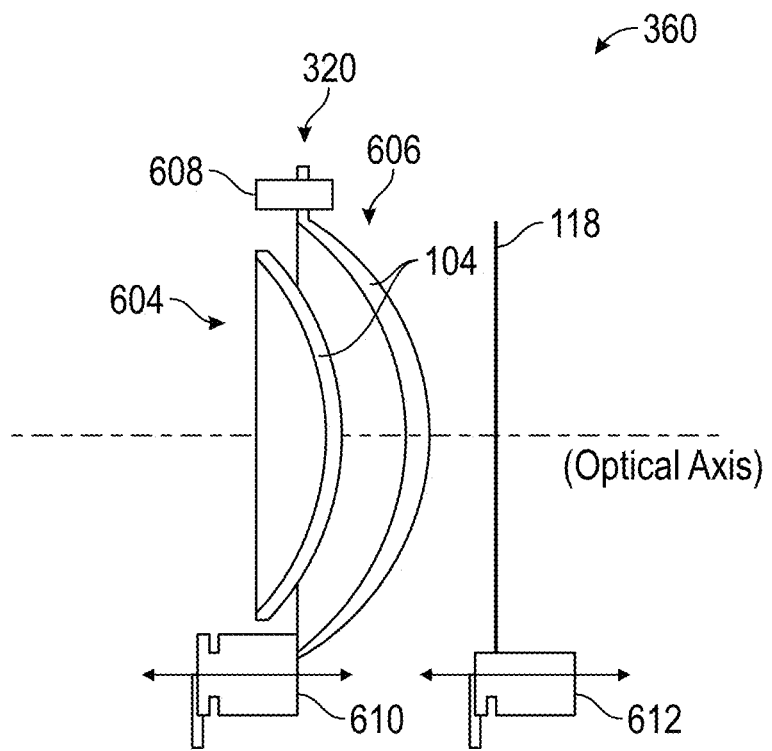
FIG. 6 illustrates a cross-sectional side view of variable focus components for a head-mountable display device, in accordance with aspects of the disclosure.

For example, FIG. 6 illustrates a cross-sectional view of a portion of display assembly 360 in which lens block 320 is a pancake lens block having two curved lenses 104 spaced apart from each other. In this example, lens block 320 is provided with an actuator 610 (e.g., a motor, a piezoelectric component, or the like) arranged to modify the position and/or shape of one of the lenses 104 to adjust the focal length (or power) of the optical system of head-mountable display device 102, to move the resulting image plane and provide accommodation for the determined vergence depth. In one example, modifying the position and/or shape of one of the lenses 104 includes changing a distance between a back optical element 606 and front optical element 604. In another example, modifying the position and/or shape of one of the lenses 104 includes applying a force to a larger of the two optical elements (e.g., back optical element 606). In another example, the shape of both optical elements 604 and 606 can be changed simultaneously or a combination of changing at least one of the optical element's shape or changing the distance between the two optical elements is used to change the focal length of the lens block 320.

In one example, modifying the position and/or shape of one of the lenses 104 includes operating a voice coil motor capable of providing approximately 3-4 mm of linear travel to move back optical element 606 relative to front optical element 604. Guide shafts 608 or other structural limiters may also be provided to guide the movement of back optical element 606 and prevent tilt. A piezo-electric motor, or some other suitable motor, may in some embodiments be used as an alternative to a voice coil motor in this implementation.

In another example, back optical element 606 may be mounted in stationary housing or threaded collar and may include a male thread on the outside edge while the inside of threaded collar includes a female thread. In another example, lenses 104 can be provide in a vacuum pressure housing so that vacuum pressure between or around lenses 104 can be used to vary the focal length of the optical system based on the determined vergence plane/depth.

In addition to these examples for variable focus actuation, it should also be appreciated that the focus of the optical system can also, or alternatively, be modified by adjustment of other components such as liquid tunable lenses, liquid crystal optics, multifocal optics, light-field displays, multifocal liquid crystal optics, Alvarez lenses, and/or Pancharatnam-Berry phase (PBP) lenses (as examples).

As illustrated in FIG. 6, an actuator 612 can also, or alternatively, be coupled to display panel 118 to adjust the image plane of the optical system including display panel 118 and lens block 320 based on the determined vergence plane/distance.

In any of the various implementations described herein for actuating components of a display system to adjust the focal length and/or the resulting image plane, to reduce accommodation/vergence conflict, the time for actuation of the optical element(s) can cause undesirable effects such as delays in rendering, missed frames, and/or can be too late to catch up with the eye movements of the user.

In accordance with aspects of the subject disclosure, a predicted vergence plane and/or vergence depth for a future display frame can be obtained, so that adjustment of the optical element(s) can begin in advance for that future display frame. Because the future (predicted) vergence planes/depths may not be known with exact certainty, a zone of comfort associated with each predicted vergence plane can be adaptively modified based on, for example, a confidence level for each predicted vergence plane, and/or other information such as scene content information at the time of the future display frame, user calibration information, and/or user modeling data. Further details of the vergence plane prediction and the modifications to the zone of comfort and actuation of variable focus components are described hereinafter.

Figure 7:
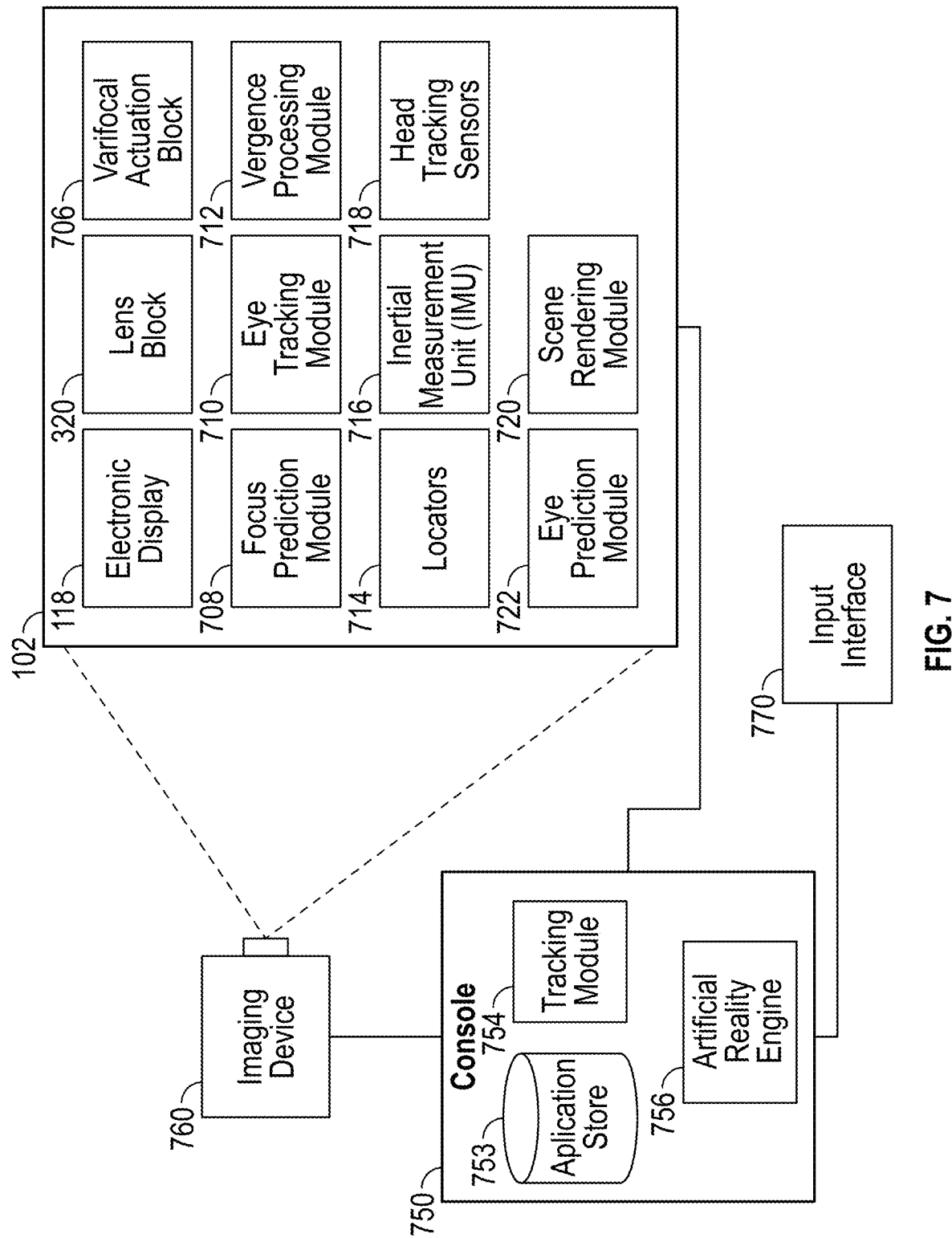
FIG. 7 illustrates a schematic diagram of a head-mountable display system, in accordance with aspects of the disclosure.

FIG. 7 illustrates a schematic diagram of various components of system 100, including components for prediction of gaze locations and/or vergence planes, and/or components for predictive foveated display and/or predictive variable focus operations. As shown in FIG. 7, system 100 may include head-mountable display device 102 with display panel 118 and lens block 320. In this example, the system 100 also includes imaging device 760, and input interface 770, which are each coupled to console 750.

While FIG. 7 shows a single head-mountable display device 102, a single imaging device 760, and a single input interface 770, it should be appreciated that any number of these components may be included in the system. For example, system 100 may include multiple head-mountable display devices 102 each having an associated input interface 770 and being monitored by one or more imaging devices 760, and with each head-mountable display device 102, input interface 770, and imaging devices 760 communicating with the console 750. In alternative configurations, different and/or additional components may also be included in system 100.

Head-mountable display device 102 operates display 118 and/or other components such as audio components to present content to a user. In this example, head-mountable display device 102 includes a varifocal actuation block 706, focus prediction module 708, eye tracking module 710, vergence processing module 712, one or more locators 714, internal measurement unit (IMU) 716, head tracking sensors 718, scene rendering module 720, and eye prediction module 722.

Varifocal actuation block 706 includes one or more variable focus elements (e.g., one or more of actuators 610 or 612 of FIG. 6, one or more liquid tunable lenses, one or more microlenses of a light field display, etc.) that adjust one or more components of optical block 320 and/or display panel 118 to vary the focal length (or optical power) of head-mountable display device 102 to keep a user's eyes in a zone of comfort as vergence and accommodation change. In one example in which the adjustment of the variable focus elements is a mechanical movement of the components, varifocal actuation block 706 physically changes the distance between the two optical elements of optical block 320 based on a predicted vergence plane and/or a current vergence plane for a user. In the same example of mechanical focus variation, alternatively, or in addition to altering the distance between optical elements, varifocal actuation block 706 may change the focal length of optical block 320 by applying a force to one of the back optical element 606 or the front optical element 604 described in FIG. 6. In various examples of mechanical and/or other variable focus implementations, varifocal actuation block 706 may include actuators, motors, vacuum pressure controllers, controllable polarizers, electronic and/or mechanical components for tuning liquid tunable lenses and/or other liquid crystal optics, light field display components, and so forth, that change the shape, position, orientation, and/or phase, polarization, and/or other responsivity of at least one optical element of optical block 320. Varifocal actuation block 706 may adjust the arrangement of optical block 320 and/or display panel 118 based a current vergence plane, or based on a predicted vergence plane for a user.

For example, varifocal actuation block 706, may set and/or change the state of optical block 320 and/or display panel 118 to achieve a desired focal length and/or object distance that alleviates accommodation/vergence conflict for a particular current or predicted vergence plane for the user.

Focus prediction module 708 is an encoder including logic that tracks the state of optical block 320 to predict to one or more future states of optical block 320. For example, focus prediction module 708 accumulates historical information corresponding to previous states of optical block 320 and predicts a future state of optical block 320 based on the previous states. Because rendering of a scene by device 102 is adjusted based on the state of optical block 320, the predicted state allows scene rendering module 720, further described below, to determine an adjustment to apply to the scene for a particular frame. Accordingly, focus prediction module 708 communicates information describing a predicted state of optical block 320 for a frame to scene rendering module 720. Adjustments for the different states of optical block 320 performed by scene rendering module 720 are further described below. Focus prediction module 708 may operate to predict the state of optical block 320 even for variable focus operations based on a current vergence plane.

Eye tracking module 710 may receive eye tracking data from eye tracking units 215 and track an eye position and eye movement of an eye 350 of a user based on the eye tracking data. A camera or other optical sensor of an eye tracking unit 215 inside head-mountable display device 102 captures image information for a user's eyes, and eye tracking module 710 uses the captured image information to determine an interpupillary distance, an interocular distance, a three-dimensional (3D) position of each eye 350 relative to display panel 118 and/or one or more of lenses 104 (e.g., for distortion adjustment purposes), including a magnitude of torsion and rotation (e.g., roll, pitch, and yaw).

Eye tracking module 710 may track up to six degrees of freedom (e.g., 3D position, roll, pitch, and yaw) of each eye 350 and at least a subset of the tracked quantities may be combined from two eyes of a user to estimate a gaze location and/or a vergence plane. In some examples, a 3D location or position of the user's gaze in a virtual scene may be determined. For example, eye tracking module 710 integrates information from past eye tracking measurements, measurements identifying a position of a user's head, and 3D content information describing a scene presented by display panel 118.

Eye tracking module 710 may output eye tracking data such as a set of past gaze directions for each eye, a set of past vergence planes for the user's eyes, a current gaze direction for each eye, a current vergence plane for the user's eyes, and/or a current direction, speed, and/or acceleration of motion of each of the user's eyes. The eye tracking data that is output from eye tracking module 710 may be provided to vergence processing module, scene rendering module 720, focus prediction module 708, and/or eye prediction module 722 of head-mountable display device 102. The eye tracking data that is output from eye tracking module may also be provided externally of head-mountable display device 102 to, for example, artificial reality engine 756 of console 750.

Eye prediction module 722 may generate one or more predicted gaze locations and/or one or more predicted vergence planes based on the eye tracking data (e.g., the current gaze location, the current vergence plane, and current and past gaze directions, velocities, and/or accelerations of the motion of each eye) that is received from eye tracking module, and/or other information (e.g., scene content information and/or user calibration information). The predicted gaze locations and/or predicted vergence planes may be determined based on the first two, three, or more than three measurements of the velocity and/or acceleration of the user's eyes, during an eye movement. Eye prediction module 722 may generate predicted gaze locations and/or predicted vergence planes for a next image frame to be displayed by display panel 118, and/or for one or more subsequent image frames. As example, eye prediction module 722 may generate a next-frame prediction, a two-frame prediction, a three-frame prediction, a five-frame prediction, a ten-frame prediction, etc. for the gaze location and/or the vergence plane. As another example, eye prediction module 722 may generate multiple predictions for multiple upcoming times such as a 10 millisecond (ms) prediction, a 20 ms prediction, a 30 ms prediction, a 50 millisecond prediction, and a 100 ms prediction. For example, for vergence plane predictions, varifocal actuation block 706 may have a known maximum adjustment time (e.g., in ms). Eye prediction module 722 may generate predicted vergence planes at future times that are based on (e.g., one or more multiples of) this known latency in the varifocal actuation block 706. It should be appreciated that these prediction times may be independent of the display frame time.

Eye prediction module 722 may generate a confidence level for each predicted gaze location and/or vergence plane. For example, during a particular movement of the user's eyes, the confidence level(s) for the predicted gaze location (s) and/or vergence plane(s) at the end of that movement may increase as more eye tracking data is provided, during the movement, from eye tracking module 710. Further features of eye prediction module 722 will be described hereinafter (e.g., in connection with FIG. 8).

Vergence processing module 712 may operate on a vergence depth or vergence plane received from eye tracking module 710 to determine a modification of optical block 320 and/or display 110 to achieve a corresponding image plane depth to maintain a zone of comfort for the user. In some implementations, the current vergence depth may also, or alternatively, be determined by vergence processing module 712 (e.g., based on gaze direction information for each eye as provided from eye tracking module 710).

Locators 714 are components located in specific positions on head-mountable display device 102 relative to one another and relative to a specific reference point on head-mountable display device 102. Locators 714 may be implemented as a light emitting diode (LED), a corner cube reflector, a reflective marker, another type of light source that contrasts with an environment in which head-mountable display device 102 operates, or some combination thereof. Active locators 714 (e.g., an LED or other type of light emitting device) may emit light in the visible band (e.g., between 380 nm to 750 nm), in the infrared (IR) band (e.g., between 750 nm to 1 mm), in the ultraviolet band (e.g., between 10 nm to 380 nm), some other portion of the electromagnetic spectrum, or some combination thereof.

Locators 714 can be located beneath an outer surface of head-mountable display device 102, which is transparent to the wavelengths of light emitted or reflected by locators 714 or is thin enough not to substantially attenuate the wavelengths of light emitted or reflected by locators 714. Further, the outer surface or other portions of head-mountable display device 102 can be opaque in the visible band of wavelengths of light. Thus, locators 714 may emit light in the IR band while under an outer surface of head-mountable display device 102 that is transparent in the IR band but opaque in the visible band.

Inertial measurement unit (IMU) 716 is an electronic device that generates fast calibration data based on measurement signals received from one or more of head tracking sensors 718, which generate one or more measurement signals in response to motion of head-mountable display device 102. Examples of head tracking sensors 718 include accelerometers, gyroscopes, magnetometers, other sensors suitable for detecting motion, correcting error associated with IMU 716, or some combination thereof. Head tracking sensors 718 may be located external to IMU 716, internal to IMU 716, or some combination thereof.

Based on the measurement signals from head tracking sensors 718, IMU 716 generates fast calibration data indicating an estimated position of head-mountable display device 102 relative to an initial position of head-mountable display device 102. For example, head tracking sensors 718 include multiple accelerometers to measure translational motion (forward/back, up/down, left/right) and multiple gyroscopes to measure rotational motion (e.g., pitch, yaw, and roll). IMU 716 can, for example, rapidly sample the measurement signals and calculate the estimated position of head-mountable display device 102 from the sampled data. For example, IMU 716 integrates measurement signals received from the accelerometers over time to estimate a velocity vector and integrates the velocity vector over time to determine an estimated position of a reference point on head-mountable display device 102. The reference point is a point that may be used to describe the position of head-mountable display device 102. While the reference point may generally be defined as a point in space, in various embodiments, reference point is defined as a point within head-mountable display device 102 (e.g., a center of the IMU 716). Alternatively, IMU 716 provides the sampled measurement signals to console 750, which determines the fast calibration data.

IMU 716 can additionally receive one or more calibration parameters from console 750. As further discussed below, the one or more calibration parameters are used to maintain tracking of head-mountable display device 102. Based on a received calibration parameter, IMU 716 may adjust one or more IMU parameters (e.g., sample rate). In some embodiments, certain calibration parameters cause IMU 716 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Scene render module 720 receives content for the artificial scene from artificial reality engine 756 and provides the content for display on display panel 118. Additionally, scene render module 720 can adjust the content based on information from focus prediction module 708, vergence processing module 712, IMU 716, head tracking sensors 718, and eye prediction module 722. For example, upon receiving the content from engine 756, scene render module 720 adjusts the content based on the predicted state of optical block 320 received from focus prediction module 708. For example, scene render module 720 may apply a distortion correction to display content to be displayed (e.g., by warping a rendered image frame prior to display based on the predicted state of optical block 320) to counteract any distortion of the displayed image frame that may be caused by the optical elements of optical block 320. A predicted three-dimensional gaze location (e.g., based on a predicted gaze location and a predicted vergence plane) can be used to predict this distortion correction in some scenarios (e.g., by providing the predicted three-dimensional gaze location to focus prediction module 708). Additionally, scene render module 720 determines a portion of the content to be displayed on electronic display 118 based on one or more of tracking module 754, head tracking sensors 718, or IMU 716, as described further below.

Scene render module 720 and/or other processing circuitry within head-mountable display device 102 and/or console 750 may divide an image from (or series of images frames) into a high resolution portion 430, a transitional portion 440 and a peripheral portion 400, as described herein, to render a foveated display image frame for display by display panel 118.

Scene render module 720 determines the location, size, and/or shape of each of high-resolution region 430, transitional region 440, and peripheral region 400 to be rendered based on a current gaze location from eye tracking module 710 and/or one or more predicted gaze locations from eye prediction module 722. Scene render module 720 may then render the high-resolution region 430 at, for example, a target resolution (e.g., a resolution corresponding to a fovea region of a human eye), and render the peripheral portion 400 at a resolution that is lower than the resolution of high-resolution portion 430. In some operational scenarios, high-resolution region 430 can be upsampled (such as via super-resolution techniques), if desired, to achieve a target resolution. In some operational scenarios, scene render module 720 may adjust the content of the peripheral portion 400 based on a predicted gaze location and a confidence level for that predicted gaze location. For example, scene render module 720 may apply a fill to peripheral portion 400 depending on the confidence level for a predicted gaze location.

Scene render module 720 may also apply a blending function to adjust the resolution of transitional portion 440 to be rendered, such that, upon rendering, the resolution smoothly transitions from a resolution of the high-resolution portion 430 of the image to the resolution of the background region 400. The blending function may correspond to the fall off in acuity associated with a transition from a fovea to a non-fovea region of a human eye. The blending function may be, for example, a Gaussian pyramid decomposition function, a Gaussian blending function, some function that smoothly transitions from the resolution of the inset region to the resolution of the background region, or some combination thereof. Additionally, the pyramid blending function may include performing a Gaussian pyramid decomposition, (e.g., to smooth the content with an appropriate smoothing filter and then subsample the smoothed content and continue the process for a predetermined level of sampling density. The sub sampled and smoothed content may be blended to the original content using a Gaussian blending function. The blended transitional portion may be used for the transitional region 440 of the composite content.

Scene render module 720 may also fade (e.g., reduce the display intensity) in the peripheral portion 400 and/or the transitional portion 440 using an intensity fading function. In some operational circumstances, scene render module 720 may adjust the resolution of some or all of one or more of high-resolution portion 430, transitional portion 440, and/or peripheral portion 400 (e.g., by intentionally blurring an object in the high-resolution region 430 that is at a different depth from another object in the high-resolution region on which the user's eyes are verged), based on a predicted vergence plane, to enhance the depth cues that allow the user to verge and focus on various objects. This artificial defocus blur may further help simulate the real world effect in which the eye has a limited depth of field. Since a displayed image frame is likely to be entirely at a single focal plane, even though the image frame my contain objects at different depths, scene render module may artificially blur objects in the image frame, based on their distance from the focal plane. This artificial defocus may be performed by rendering the high-resolution region 430 at a full resolution, and then artificially applying a defocus blur for objects in that region that are at depths that are far from the focal plane, or may be performed by rendering objects in the high-resolution region that are at depths that are far from the focal plane at a lower resolution. This artificial defocus blur may be performed only for objects in the high-resolution region (e.g., where the user's vision can best perceive the effect), in the high-resolution region 430 and the transitional portion 440, or in all of the high-resolution region 430, the transitional portion 440, and the peripheral portion 400.

When operating based on predicted eye data such as predicted gaze locations and/or predicted vergence planes, scene render module 720 may pre-render one or more image frames and store the pre-rendered image frames prior to display of those image frames. Pre-rendered image frames may also be adjusted and/or replaced, prior to display, when updated and/or improved predicted eye data is obtained.

Imaging device 760 generates slow calibration data in accordance with calibration parameters received from console 750. Slow calibration data includes one or more images showing observed positions of locators 714 that are detectable by imaging device 760. Imaging device 760 may include one or more cameras, one or more video cameras, other devices capable of capturing images including one or more locators 714, or some combination thereof. Additionally, imaging device 760 may include one or more filters (e.g., for increasing signal to noise ratio). Imaging device 760 is configured to detect light emitted or reflected from locators 714 in a field of view of imaging device 760. In embodiments where locators 714 include passive elements (e.g., a retroreflector), imaging device 760 may include a light source that illuminates some or all of locators 714, which retro-reflect the light towards the light source in imaging device 760. Slow calibration data is communicated from imaging device 760 to console 750, and imaging device 760 receives one or more calibration parameters from console 750 to adjust one or more imaging parameters (e.g., focal length, focus, frame rate, ISO, sensor temperature, shutter speed, aperture, etc.).

Input interface 770 is a device that allows a user to send input such as action requests to console 750. An action request is a request to perform a particular action. For example, an action request may be to start or end an application or to perform a particular action within the application. Input interface 770 may include one or more input devices. Example input devices include a keyboard, a mouse, a game controller, or any other suitable device for receiving action requests and communicating the received action requests to console 750. An action request received by input interface 770 is communicated to console 750, which performs an action corresponding to the action request. In some embodiments, input interface 770 may provide haptic feedback to the user in accordance with instructions received from console 750.

Console 750 provides content to head-mountable display device 102 for presentation to the user in accordance with information received from imaging device 760, head-mountable display device 102, and/or input interface 770. In the example shown in FIG. 7, console 750 includes application store 752, tracking module 754, and engine 756. Some implementations of console 750 have different or additional modules than those described in conjunction with FIG. 7. Similarly, the functions further described below may be distributed among components of console 750 in a different manner than is described here.

Application store 752 stores one or more applications for execution by console 750. An application is a group of instructions, that when executed by a processor, generates content for presentation to the user. Content generated by an application may be in response to inputs received from the user via movement of head-mountable display device 102 and/or interface device 770. Examples of applications include gaming applications, conferencing applications, video playback application, or other suitable applications.

Tracking module 754 tracks the movement of head-mountable display device 102 using slow calibration information from imaging device 760 and determines positions of a reference point on head-mountable display device 102 using observed locators 714 from the slow calibration information and a model of head-mountable display device 102. Tracking module 754 also determines positions of the reference point on head-mountable display device 102 using position information from the fast calibration information from IMU 716 on head-mountable display device 102. Additionally, tracking module 754 may use portions of the fast calibration information, the slow calibration information, or some combination thereof, to predict a future location of head-mountable display device 102, which is provided to engine 756.

Engine 756 executes applications within the system and receives position information, acceleration information, velocity information, predicted future positions, or some combination thereof for head-mountable display device 102 from tracking module 754. Based on the received information, engine 756 determines content to provide to head-mountable display device 102 for presentation to the user, such as an artificial scene. For example, if the received information indicates that the user has looked to the left, engine 756 generates content for head-mountable display device 102 that is to the left of previously displayed content, in accordance with the user's movement in the artificial environment. Additionally, engine 756 performs an action within an application executing on console 750 in response to an action request received from the input interface 770 and provides feedback to the user that the action was performed. The provided feedback may be visual or audible feedback via head-mountable display device 102 or haptic feedback via input interface 770. It should be appreciated that, in various implementations, some or all of the operations described as being performed by scene render module 720 may be performed elsewhere, such as by AR engine 756.

Figure 8:
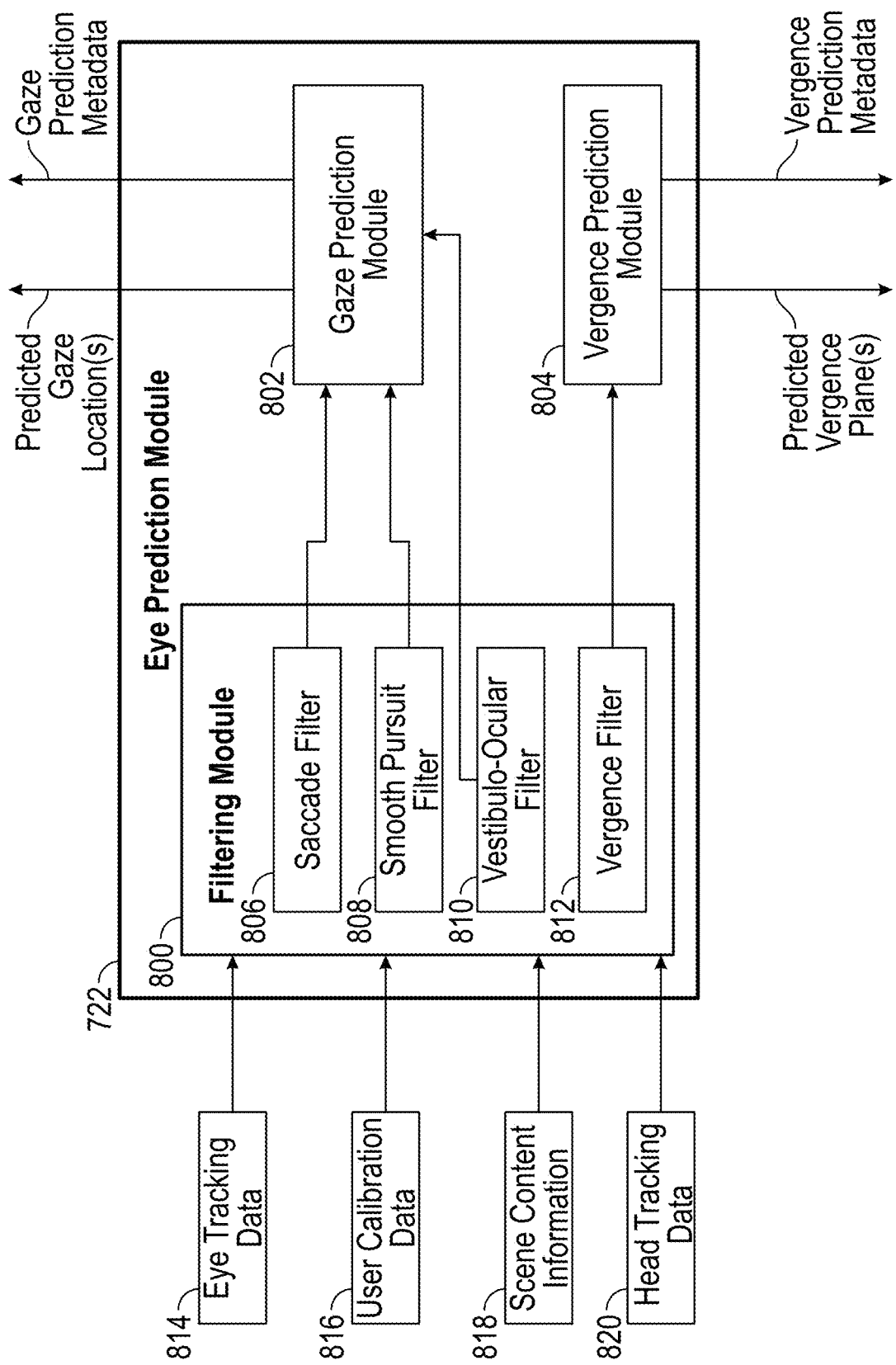
FIG. 8 illustrates a schematic diagram of an eye-prediction module for a head-mountable display system, in accordance with aspects of the disclosure.

Example Eye Prediction Components and Methods for Head-Mountable Display Devices FIG. 8 illustrates a schematic diagram of an exemplary implementation of eye prediction module 722. As shown, eye prediction module 722 may include a filtering module 800, a gaze prediction module 802, and a vergence prediction module 804. Filtering module 800 may receive eye tracking data 814 (e.g., a current gaze direction, a current gaze direction of motion, and a current gaze speed of motion for each eye, and/or other eye tracking data such as current and/or past raw position and/or orientation data for one or more parts of each of the user's eye) from eye tracking module 710, and may output predictions such as predicted gaze locations and/or predicted vergence planes.

Filtering module 800 may also receive other data such as user calibration data 816, scene content information 818, and/or head tracking data 820. User calibration data 816 may be obtained in, for example, a training session for each particular user. In a training session, a user wearing head-mountable display device 102 may be presented, by display panel 118, with visual stimuli that cause the user's eyes to move in one or more known types of eye movement.

For example, four types of human eye movement include saccade movements (e.g., rapid movements of both eyes together to a gaze direction), smooth pursuit movements (e.g., relatively slower movements of both eyes together, typically following a moving object), vestibulo-ocular movements (e.g., relatively slow stabilizing movements of the two eyes together that stabilize the vision for motions of the body and/or head), and vergence movements (e.g., convergence or divergence movements, separately, of the gaze direction of the eyes in different directions).

Visual stimuli may be provided by display 118, during a device training session for each user, that cause the user's eye to perform one or more of these four types of eye movements. Eye tracking data gathered by eye tracking units 215 during the known eye movements can be later used by filtering module 800 to (i) identify the type of eye movement being performed by the user's eyes during normal operation of device 102, and (ii) predict one or more future gaze locations and/or vergence planes using the eye tracking data and the identified type of eye movement.

Because the human eye generally performs one of these four basic types of movements, eye prediction module 722 may include a processing filter corresponding to each type of natural eye movement. For example, filtering module 800 may include a saccade filter 806, a smooth pursuit filter 808, a vestibulo-ocular filter 810, and a vergence filter 812. Although other movement filters can be included in filtering module 800, it should be appreciated that the predicted gaze location and the predicted vergence plane generated by eye prediction module 722 are restricted (e.g., by the filters) to those predictions that can be achieved by eye movements that can be naturally performed by the human eye. Saccade filter 806, smooth pursuit filter 808, vestibulo-ocular filter 810, and vergence filter 812 and/or other natural eye movement filters may each receive eye tracking data (e.g., past and/or future gaze locations, and/or a direction and a speed of the movement of each eye) from eye tracking module 710, and may each process the received eye tracking data based on an assumption that the current eye movement is the type of eye movement corresponding to that filter.

For example, each of saccade filter 806, smooth pursuit filter 808, vestibulo-ocular filter 810, and vergence filter 812 may attempt to fit or apply the received eye tracking data to one or more curves, surfaces, or other models (e.g., an adjustable parameterized model, or a trained machine-learning model) corresponding to that type of eye movement, and may generate a confidence level that the current eye movement is the type of eye movement corresponding to that filter based on, for example, the goodness of the fit. The curve or other model to which each of saccade filter 806, smooth pursuit filter 808, vestibulo-ocular filter 810, and vergence filter 812 attempts to fit or apply the received eye tracking data may be unique to each filter (e.g., a curve or model corresponding to the known features of that type of eye movement) and may be tuned (e.g., using user calibration data 816) to each particular user of device 102 (e.g., based on the user calibration data 816, which may be used as, for example, training data for a machine-learning model particular to each type of eye movement). The type of eye movement currently being performed by a user may be identified by one of the filters 806, 808, 810, or 812 when the confidence level within that filter rises to a predetermined threshold, or the confidence levels of multiple filters can be compared until one of the confidence levels rises above all other confidence levels by a predetermined comparison threshold. For example, confidence levels may change as new eye tracking data is received and incorporated into an attempted fit. For example, in the smooth pursuit filter 808, if the current eye movement is a smooth pursuit movement, the confidence level will rise with additional eye tracking data, while decreasing in all other filters.

In some examples, once filtering module 800 identifies the type of eye movement, the type of eye movement and the eye tracking data (e.g., including the eye tracking data used for the determination and additional eye tracking data being continually obtained following the identification) can be provided to one or both of gaze prediction module 802 or vergence prediction module 804. For example, when a saccade, a smooth pursuit movement, or a vestibulo-ocular movement is identified, that identified type of movement and the eye tracking data (e.g., the eye tracking data used for the identification and additional eye tracking data being continually obtained) may be provided to gaze prediction module 802. In these examples, gaze prediction module 802 then determines one or more predicted future gaze locations, and one or more corresponding confidence levels for each of the predicted future gaze locations. The predicted gaze location(s) and gaze prediction metadata, including the confidence level for each predicted gaze location, may then be provided from gaze prediction module 802 to, for example, scene rendering module 720, focus prediction module 708, and/or artificial reality engine 756 for rendering (e.g., pre-rendering) of foveated display image frames for display by display panel 118. When a vergence movement is identified, that identified type of movement and the eye tracking data (e.g., the eye tracking data used for the identification and additional eye tracking data being continually obtained) may be provided to vergence prediction module 804. In these examples, vergence prediction module 804 then determines one or more predicted future vergence planes or depths, and one or more corresponding confidence levels for each of the predicted vergence planes or depths. The predicted vergence plane(s) and vergence prediction metadata, including the confidence level for each predicted vergence plane, may then be provided from vergence prediction module 804 to, for example, scene rendering module 720, focus prediction module 708, artificial reality engine 756, and/or vergence processing module 712 for variable focus display with display assembly 360.

In the above examples, the type of eye movement and the predictions of gaze locations and/or vergence planes are performed in separate, distinct operations. However, it should also be appreciated that the type identification and the predictions can be performed in parallel or partially parallel operations. For example, each of saccade filter 806, smooth pursuit filter 808, vestibulo-ocular filter 810, and vergence filter 812 may generate and/or update predictions and confidence levels with each incoming eye tracking measurement. For example, with each attempted fit or application of eye tracking data to a saccade model, saccade filter 806 may generate a confidence level and a predicted gaze location, and output the saccade-based gaze prediction when the confidence level for that prediction rises above a predetermined threshold. In the examples of a saccade, although smooth pursuit filter 808, vestibulo-ocular filter 810, and vergence filter 812 are generating predictions in parallel with the saccade filter 806, these predictions will not be used, as the eye tracking data will cause the confidence levels in those predictions to be lower than the confidence level in the saccade filter, and to decrease with additional data.

It should also be appreciated that the models for any or all of saccade filter 806, smooth pursuit filter 808, vestibulo-ocular filter 810, and vergence filter 812 can be tuned to each user of head-mountable display device 102 in a training session prior to normal operations of the device, and/or during normal use of head-mountable display device 102 as the models learn and adapt to the behavior of each user's eyes over time.

Scene content information 818 may also be used by one or more of filters 806, 808, 810 or 812 in some scenarios. For example, when a smooth pursuit movement is identified by filtering module 800, an object in the scene being presented to the user may be identified as the object being pursued. In this scenario, because the movement of the object in the scene is known in advance, the advanced knowledge can be applied to the predicted future gaze locations during visual pursuit of that object. In another example, in a scenario in which the user's eye is performing a saccade movement in the direction of a recent visual stimulus (e.g., an explosion, or a game character entering through a door), the location of the recent visual stimulus can be used to determine the predicted gaze location at the end of the current saccade (e.g., by applying a constraint or an additional input data point to the model to make it more likely that the eye is predicted to be moving to the location of the recent visual stimulus). Scene content information 818 may also be used in determining a confidence level for a predicted gaze location and/or a predicted vergence plane. For example, in a scenario in which an active scene object is displayed at or near a predicted gaze location, the confidence level for that predicted gaze location may be higher than the confidence level in a scenario in which only background is displayed at the predicted gaze location.

Head tracking data 820 (e.g., from tracking module 754, IMU 716, and/or head tracking sensors 718) may also be used by one or more of filters 806, 808, 810 or 812 in some scenarios. For example, when a vestibulo-ocular movement is identified by filtering module 800, the head tracking data can be used to predict upcoming movements of the user's eyes to compensate for some or all of a head movement indicated by the head-tracking data. Head motion information, as indicated by the head tracking data 820, can also be used to enhance the predictions for saccade movements, smooth pursuit movements, and/or vergence movements (e.g., alone or in combination with the user calibration data 816 and/or scene content information 818).

It should also be appreciated that, while gaze prediction module 802 and vergence prediction module 804 are shown separately, in some implementations, gaze prediction and vergence prediction can be performed by a common module and/or concurrently (e.g., by predicting a three-dimensional gaze location based on an identified type of eye movement and eye tracking data).

Figure 9:
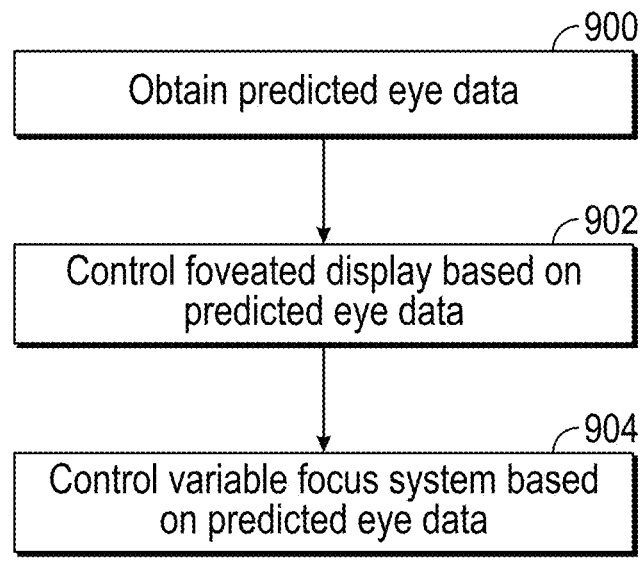
FIG. 9 illustrates a flow chart of illustrative operations that may be performed for operation of a head-mountable display device using predicted eye data, in accordance with aspects of the disclosure.

FIG. 9 illustrates a flow diagram of an example process for predictive operation of an electronic display, such as a display panel in a head-mountable display device, in accordance with one or more implementations. For explanatory purposes, the process of FIG. 9 is primarily described herein with reference to one or more devices of FIGS. 1-3 and 5-8 (particularly with reference to head-mountable display device 102, eye tracking units 215, eye tracking module 710, eye prediction module 722, scene rendering module 720, vergence processing module 712, varifocal actuation block 706, display assembly 360, and display panel 118), some of which may be executed by one or more processors of head-mountable device 102 of FIG. 1. However, the process of FIG. 9 is not limited to these devices and/or modules, and one or more blocks (or operations) of the process may be performed by one or more other components of other suitable devices. Further for explanatory purposes, the blocks of the process of FIG. 9 are described herein as occurring in series, or linearly. However, multiple blocks of the process of FIG. 9 may occur in parallel. In addition, the blocks of the process of FIG. 9 need not be performed in the order shown and/or one or more blocks of the process of FIG. 9 need not be performed and/or can be replaced by other operations.

At block 900, predicted eye data is obtained. Predicted eye data may include one or more predicted gaze locations and/or one or more predicted vergence planes or vergence depths for a user wearing a head-mountable display device such as head-mountable display device 102. Each predicted gaze location and each predicted vergence plane may have an associated prediction time in the future, such as a prediction time corresponding to a display time for an upcoming image frame for display by display panel 118. In some examples, predicted eye data may be obtained for a next upcoming image frame, and/or for two, three, four, five, ten, or more display frames from a current display frame. Obtaining the predicted eye data may include generating the predicted eye data with, for example, eye prediction module 722 of FIGS. 7 and 8. Examples of operations that may be performed for obtaining the predicted eye data are described in further detail in connection with, for example, FIGS. 7 and 8 and the flow diagrams of FIGS. 10 and 11.

At block 902, foveated display features of head-mountable display device 102 may be controlled, based on the predicted eye data. For example, scene rendering module 720 and/or AR engine 756 may generate (e.g., pre-render) a foveated display image frame such as image frame 401 of FIG. 4, having a high-resolution region around a predicted gaze location from eye prediction module 722, for display by display panel 118. Scene rendering module 720 and/or AR engine 756 may determine a size and/or a shape of the high-resolution region and/or surrounding transition regions and/or peripheral regions based on, for example, a confidence level associated with the predicted gaze location. Examples of operations that may be performed for controlling foveated display features based on predicted eye data are described in further detail in connection with, for example, FIGS. 12-18.

At block 904, a variable focus system such as vergence processing module 712 and/or varifocal actuation block 706 of head-mountable display device 102 may be controlled based on the predicted eye data. For example, when the predicted eye data includes a predicted vergence plane that is different from a current vergence plane, the vergence processing module 712 may operate the varifocal actuation block 706 to move or alter the shape of one or more components of display assembly 306 (e.g., by moving or deforming one of lenses 104 in a pancake lens block). In some examples, vergence processing module 712 may determine a zone of comfort associated with the predicted vergence plane, and modify the one or more components of the display assembly to move an image plane of the display assembly into the zone of comfort. Examples of operations that may be performed for controlling foveated display features based on predicted eye data are described in further detail in connection with, for example, FIGS. 19-23.

Figure 10:
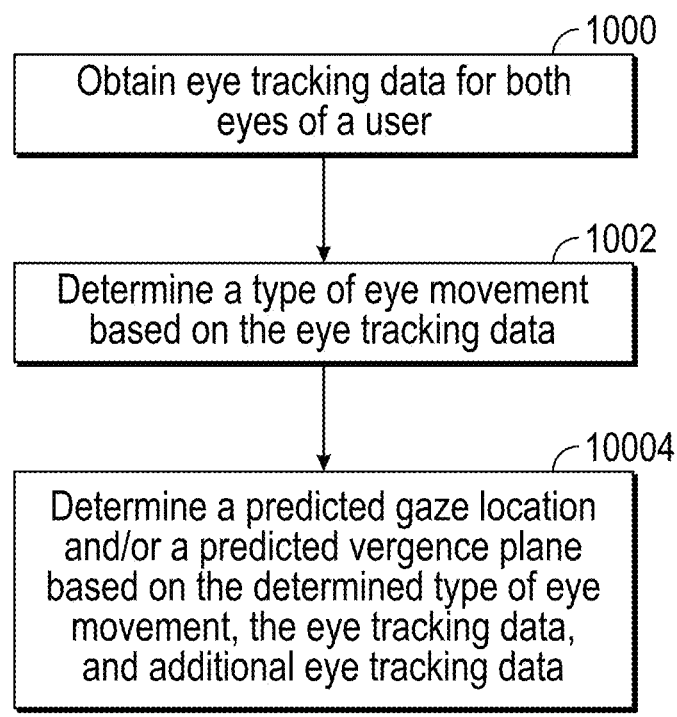
FIG. 10 illustrates a flow chart of illustrative operations that may be performed for predicting a gaze location and/or a vergence depth, in accordance with aspects of the disclosure.

FIG. 10 illustrates a flow diagram of an example process for obtaining predicted eye data, in accordance with one or more implementations. The blocks of the process of FIG. 10 are described herein as occurring in series, or linearly. However, multiple blocks of the process of FIG. 10 may occur in parallel. In addition, the blocks of the process of FIG. 10 need not be performed in the order shown and/or one or more blocks of the process of FIG. 10 need not be performed and/or can be replaced by other operations.

At block 1000, eye tracking data is obtained for both eyes of a user, such as a user wearing head-mountable display device 102. The eye tracking data may be obtained by illuminating the user's eyes with an infrared light source in each of eye tracking units 215, and capturing infrared images of the user's eyes with infrared cameras in each of eye tracking units 215. The eye tracking data may be processed to identify one or more features of the user's eyes, and to identify a current gaze location for each eye (e.g., a location corresponding to the location at which the user's foveal axis intersects display panel 118) and to identify a change (e.g., by determining a current direction and/or speed of motion) in the gaze location and/or foveal axis for each eye.

At block 1002, one or more types of eye movement are determined based on the eye tracking data. The type of eye movement may be, for example, a saccade, a smooth pursuit movement, a vestibulo-ocular movement, a vergence movement, or a combination of two or more of these types of eye movement, currently being performed by the eyes of a user of head-mountable display device 102. The type(s) of eye movement may be determined based on the first two, three, or several eye tracking data points during the eye movement, and before the eye movement is complete. Determining the type of eye movement may include simultaneously attempting to fit or apply the first several eye tracking data points to a model for each type of eye movement or to a combined model trained to categorize input data into output types of eye movement, determining a confidence level for each type of eye movement, and identifying the one or more types of eye movement based on the individual confidence levels and/or a comparison of the confidence levels. In some scenarios, a single type of eye movement (e.g., a saccade, a smooth pursuit movement, a vestibulo-ocular movement, or a vergence movement) may be indicated based on the eye tracking data. In other scenarios, the user's eyes may be performing a combined movement (e.g., a saccade to an object at a new depth, or a smooth-pursuit of a receding or approaching object), in which case two concurrent eye movement types may be identified. In other scenarios, two types of eye movement may be plausible based on the confidence levels for each type of eye movement, in which case two types of eye movement may be identified.

At block 1004, a predicted gaze location and/or a predicted vergence plane is determined based on the determined one or more types of eye movement, the eye tracking data, and additional eye tracking data points obtained after the type of eye movement has been identified and before the eye movement is complete. For example, if the eye movement is determined to be a vergence movement, the past and/or current gaze direction and/or the speed and direction of movement of the gaze direction of each eye can be used to predict the gaze direction of each eye at the end of the eye movement, from which the intersection of the locations of the two eyes can be determined to identify the vergence depth or plane. As another example, if any of a saccade, a smooth pursuit, or a vestibulo-ocular movement is singularly identified, the eye tracking data and the additional eye tracking data can be applied to the model for that type of eye movement (e.g., as tuned for the particular user), to determine the final gaze location at the end of the current eye movement. As another example, if two or more of a saccade, a smooth pursuit, and a vestibulo-ocular movement are identified as being plausible types for the eye movement currently being performed by the eyes of the user, the eye tracking data and the additional eye tracking data can be applied to the models for each type of eye movement (e.g., as tuned for the particular user), and the resulting predictions can be combined (e.g., using a weighted average based on the confidence levels) to determine the final gaze location at the end of the current eye movement. The predicted gaze location and/or the predicted vergence plane can then be used to control predictive foveated display and/or predictive variable focus features of the device.

Figure 11:
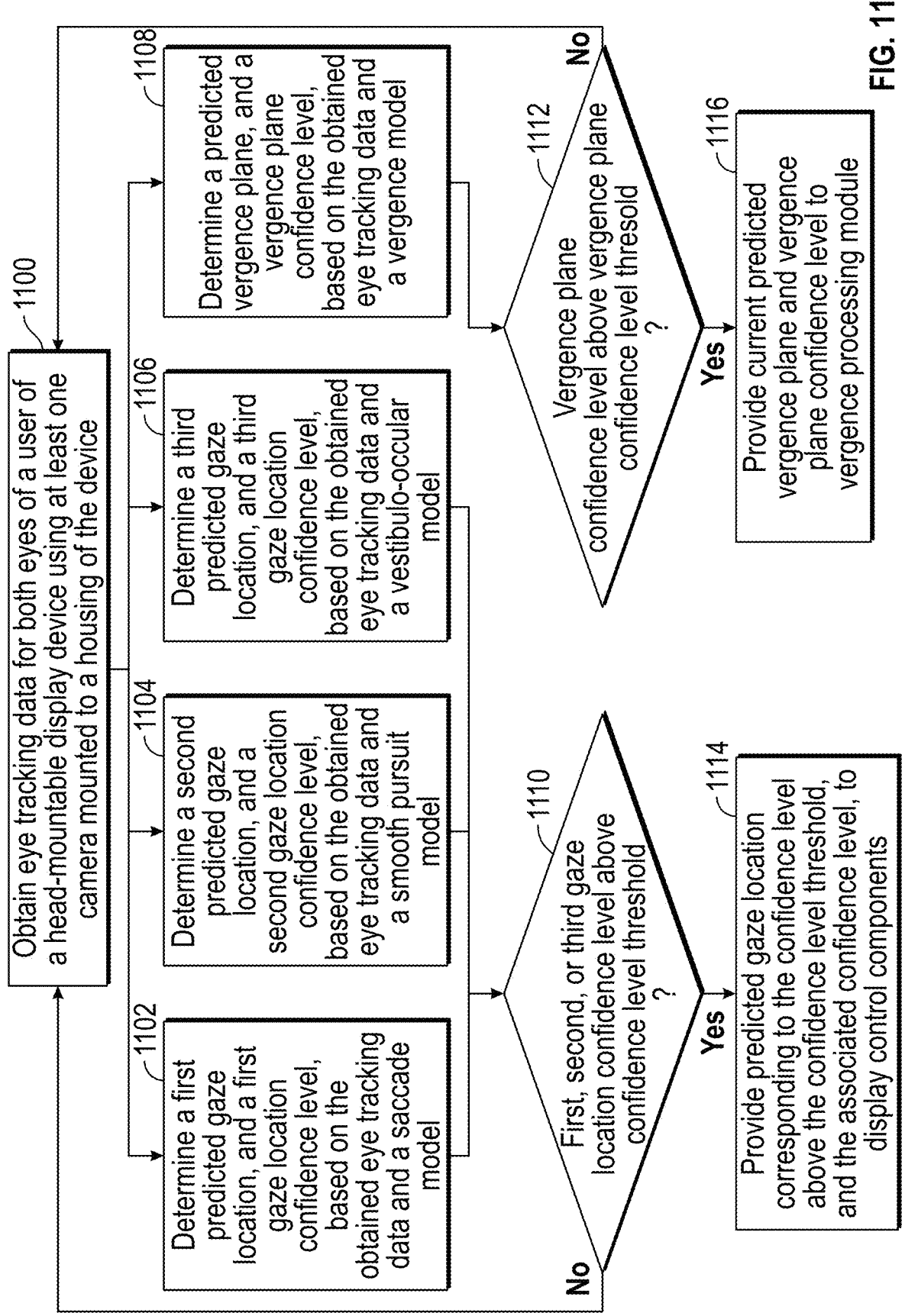
FIG. 11 illustrates another flow chart of illustrative operations that may be performed for predicting a gaze location and/or a vergence depth, in accordance with aspects of the disclosure.

In some scenarios, predicted gaze locations and/or predicted vergence planes can be determined in parallel with the identification of the type of eye movement. FIG. 11 illustrates a flow diagram of an example process for obtaining predicted eye data in which various parallel processing aspects can be seen, in accordance with one or more implementations. Some blocks of the process of FIG. 11 are described herein as occurring in series, or linearly with other blocks. However, multiple blocks of the process of FIG. 11 may occur in parallel. In addition, the blocks of the process of FIG. 11 need not be performed in the order shown and/or one or more blocks of the process of FIG. 11 need not be performed and/or can be replaced by other operations.

At block 1100, eye tracking data is obtained for both eyes of a user, such as a user wearing head-mountable display device 102, using at least one camera mounted to a housing of the device. For example, the eye tracking data may be obtained using two infrared cameras, each capturing images of the user's eyes illuminated with an infrared light source mounted in the housing. The eye tracking data may be processed to identify one or more features of the user's eyes, to identify a current gaze location for each eye (e.g., a location corresponding to the location at which the user's foveal axis intersects display panel 118), identify an eye movement, identify a change in a gaze location, and/or to determine a current direction and/or speed of motion of the gaze location and/or foveal axis for each eye.

At blocks 1102, 1104, 1106, and 1108, processing circuitry in the head-mountable display device may, in parallel, attempt to identify four (or more) types of eye movement that may be currently being performed by the user's eyes. The operations of blocks 1102, 1104, 1106, and 1108 may be performed, for example, by filtering modules 806, 808, 810, and 812, respectively, of FIG. 8.

At block 1102, a first predicted gaze location and a first gaze location confidence level may be determined (e.g., by saccade filter 806) based on the eye tracking data and using a saccade model (e.g., by attempting to fit the features of the eye tracking data to a model of the same features of an eye movement undergoing a saccade, or by providing the eye tracking data as input to a machine-learning saccade model that has been trained to output a predicted gaze location and a predicted gaze location confidence level responsive to input eye tracking data). For example, by applying the first several (e.g., two, three, or four) velocity (e.g., speed and direction) measurements obtained for the current eye movement to a model of velocity measurements typical to a saccade for a generic user or tuned for the current user (e.g., and tuning the parameters of the saccade model using the first several velocity measurements), the model can be used to output a predicted gaze location at a future time. Acceleration measurements (e.g., determined using the velocity measurements) for the current eye movement can also, or alternatively, be applied to a model of the acceleration measurements typical to a saccade (e.g., for a generic user or tuned for the current user). The goodness or quality of the model fit to the first several velocity and/or acceleration measurements can provide a confidence level for the predicted gaze location (e.g., a poor fit will result in a low confidence level, and a good fit will result in a high confidence level). As another example, a machine-learning model may be provided (e.g., in saccade filter 806 of eye prediction model 722) that has been trained (e.g., by (i) providing eye tracking data corresponding to known saccade movements for the user and/or one or more prior users of a device having eye tracking capabilities to a machine-learning model as input training data, (ii) providing the known saccade movements to the machine-learning model as output training data, and (iii) adjusting parameters of the model using the input training data and the output training data to generate a trained model) to output a predicted gaze location and a gaze location confidence level for a new input set of eye tracking data. In this machine-learning example, the predicted gaze location and the gaze location confidence level may be generated, for example, without adjusting the parameters of the model to fit the current eye tracking data. As each new eye tracking data point is obtained, the prediction, the confidence level, and/or the model parameters can be updated. If the current eye movement is, indeed, a saccade, the confidence level of the prediction based on a saccade model will increase with each added data point, and the predicted gaze location will trend toward a final prediction. If the current eye movement is not a saccade, the confidence level will decrease with each added data point as it becomes more clear from the data that the movement is not a saccade.

At block 1104, in parallel with the operations of block 1102, a second predicted gaze location and a second gaze location confidence level may be determined (e.g., by smooth pursuit filter 808) based on the eye tracking data and a smooth pursuit model (e.g., by attempting to fit the features of the eye tracking data to a model of the same features of an eye movement undergoing a smooth pursuit, or by providing the eye tracking data as input to a machine-learning smooth pursuit model that has been trained to output a predicted gaze location and a predicted gaze location confidence level responsive to input eye tracking data).

At block 1106, in parallel with the operations of blocks 1102 and 1104, a third predicted gaze location and a third gaze location confidence level may be determined (e.g., by vestibulo-ocular filter 810) based on the eye tracking data and assuming that the current eye movement of the user is a vestibulo-ocular movement (e.g., by attempting to fit the features of the eye tracking data and/or head tracking to a model of the same features for an eye movement undergoing a vestibulo-ocular movement, or by providing the eye tracking data and/or head tracking data as input to a machine-learning vestibulo-ocular model that has been trained to output a predicted gaze location and a predicted gaze location confidence level responsive to input eye tracking data).

At block 1108, in parallel with the operations of blocks 1102, 1104, and 1106, a predicted vergence plane and a vergence plane confidence level may be determined (e.g., by vergence filter 812) based on the eye tracking data and assuming that the current eye movement of the user is a vergence movement (e.g., by attempting to fit the features of the eye tracking data to a model of the same features of an eye movement undergoing a vergence movement, or by providing the eye tracking data as input to a machine-learning vergence model that has been trained to output a predicted gaze location and a predicted gaze location confidence level responsive to input eye tracking data).

The models described in connection with blocks 1102, 1104, 1106, and 1108 can also be tuned for each of one or more specific users of a head-mountable display device 102. For example, following an eye movement performed by the user during use of head-mountable display device 102, the eye tracking data, the predicted gaze location, the predicted vergence plane, the actual gaze location, and/or the actual vergence plane resulting form that eye movement can be fed back to the models (e.g., as additional training data) for further fine-tuning of the models for each user. In this way, the models can learn and adapt to the particular eye behavior or each user.

At block 1110, eye prediction module 722 may determine whether any of the first, second, or third gaze location confidence levels is above a confidence level threshold. The confidence level threshold may be a predetermined threshold that is commonly compared to each of the first, second, and third gaze location confidence levels, or may be a dynamic confidence level that changes based on the current gaze location confidence levels. For example, at block 1110, when any of the first, second, or third gaze location confidence levels rises above a common confidence level threshold, the type of eye movement associated with that confidence level may be identified as the type of eye movement currently being performed by the user. In another example, when any of the first, second, or third gaze location confidence levels rises above the other two of the first, second, and third gaze location confidence levels and/or the vergence plane confidence level, the type of eye movement associated with that confidence level may be identified as the type of eye movement currently being performed by the user.

At block 1112, eye prediction module 722 may also determine whether the vergence plane confidence level is above a vergence plane confidence level threshold. If the vergence plane confidence level is above the vergence plane confidence level threshold, eye prediction module 722 may determine that the current eye movement of the user is a vergence movement. The vergence movement can be determined, for example, by determining that the two eyes of the user are moving in different (e.g., opposite) directions horizontally.

Because, in the example of FIG. 11, a predicted gaze location is generated for each gaze location confidence level, and a vergence plane is generated for each predicted vergence plane while the type of eye movement is being identified, at the time that the eye movement is identified, the corresponding gaze location and/or vergence plane is ready to be provided to other components for foveated display and/or variable focus operations.

For example, at block 1114, if any of the first, second, or third gaze location confidence levels is above the confidence level threshold, the corresponding first, second, or third predicted gaze location may be provided to scene rendering module 720 and/or artificial reality engine 756, along with the gaze location confidence level that is above the threshold, for predictive foveated display operations. In some scenarios, at block 1114, the predicted gaze location can also be provided to vergence processing module 712 (e.g., if display content to be displayed at the predicted location is at a different depth than the display content at the user's current location, such as if the user's eyes are moving downward toward a table in front of the user from a gaze location corresponding to a distant object). In this way, the variable focus components can predictively move to anticipate a vergence change that has not yet begun.

For example, at block 1116, if the vergence plane confidence level is above the vergence plane confidence level threshold, the corresponding predicted vergence plane may be provided to vergence processing module 712 and/or focus prediction module 708, along with the vergence plane confidence level, for predictive variable focus operations.

In cases in which the gaze location and the vergence plane are both changing, one or more predicted gaze locations can be provided at block 1114 and one or more predicted vergence planes can be provided at block 1116.

Example Predictive Foveated Display Systems and Methods

Figure 12:
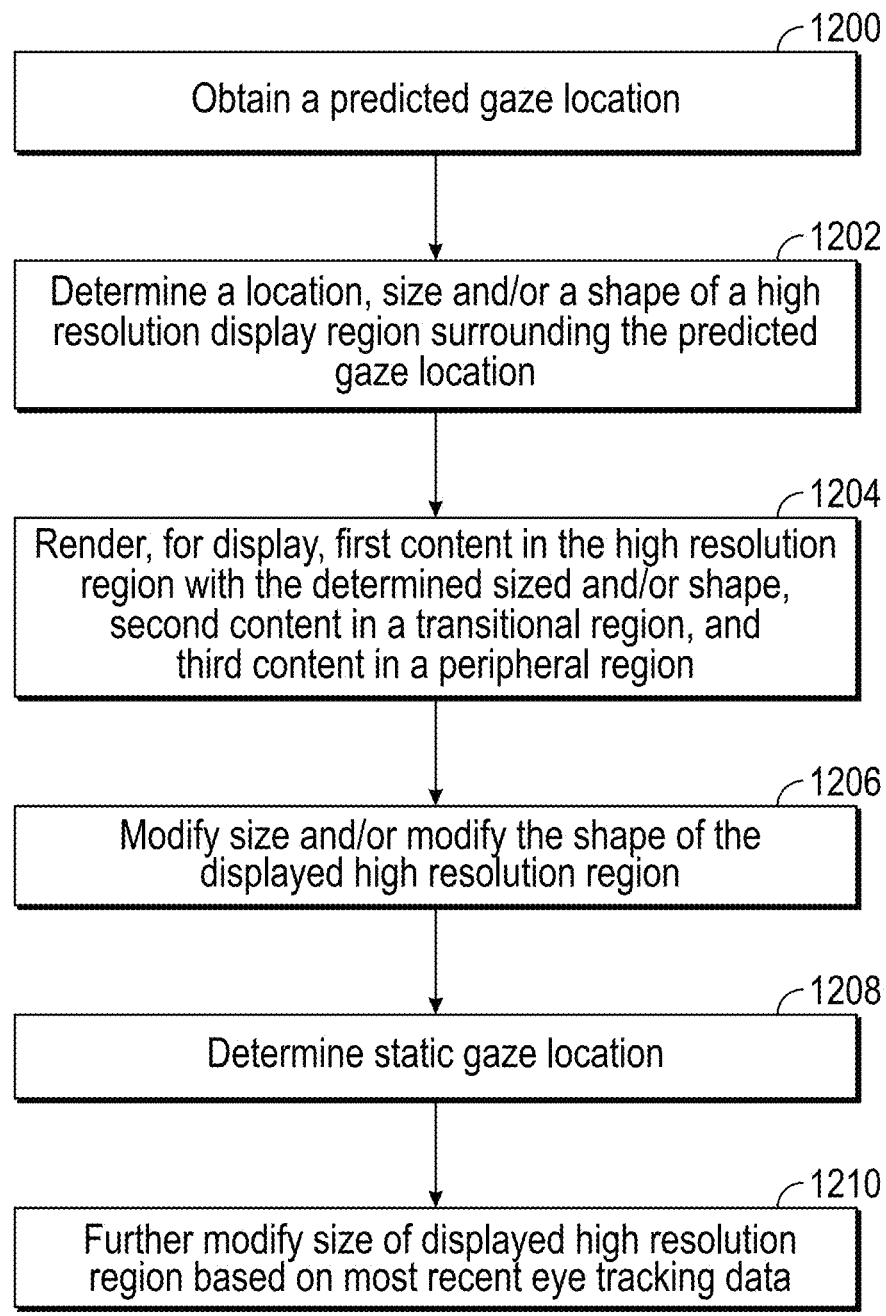
FIG. 12 illustrates a flow chart of illustrative operations that may be performed for predictive foveated display, in accordance with aspects of the disclosure.

FIG. 12 illustrates a flow diagram of an example process for predictive foveated display, in accordance with one or more implementations. For explanatory purposes, the process of FIG. 12 is primarily described herein with reference to one or more devices of FIGS. 1-3 and 7-8 (particularly with reference to head-mountable display device 102, eye tracking units 215, eye tracking module 710, eye prediction module 722, scene rendering module 720, display assembly 360, and display panel 110), some of which may be executed by one or more processors of head-mountable device 102 of FIG. 1. However, the process of FIG. 12 is not limited to these devices and/or modules, and one or more blocks (or operations) of the process may be performed by one or more other components of other suitable devices. Further for explanatory purposes, the blocks of the process of FIG. 12 are described herein as occurring in series, or linearly. However, multiple blocks of the process of FIG. 12 may occur in parallel. In addition, the blocks of the process of FIG. 12 need not be performed in the order shown and/or one or more blocks of the process of FIG. 12 need not be performed and/or can be replaced by other operations.

At block 1200, one or more predicted gaze locations are obtained. The predicted gaze location(s) may be obtained from, for example, eye prediction module 722 based on the operations of, for example, FIG. 10 or 11. The predicted gaze locations may include a one-frame prediction, a three-frame prediction, and a ten-frame prediction (as examples) corresponding to prediction times one frame, three frames, or ten frames in the future from a currently displayed frame. Each predicted gaze location have an associated confidence level that can also be obtained.

At block 1202, scene rendering module 720, AR engine 756, and/or other processing circuitry of head-mountable display device 102 and/or console 750 determines a location (e.g., a center), a size, and/or a shape of a high-resolution region for an upcoming image frame, based on one or more of the predicted gaze locations and its associated gaze location confidence level.

For example, the high-resolution region may be a rectangular or circular high-resolution region that is centered on a predicted gaze location and surrounded by a concentric rectangular or circular transition region to a surrounding peripheral region. In this example, the width or radii of the high-resolution region and the transition region can be determined based on the confidence level (e.g., inversely dependent on the confidence level). In this way, a relatively larger high-resolution region is generated at a predicted gaze location when the certainty in the prediction is relatively low. However, the example of rectangular or circular regions for the image frame is merely illustrative.

The shape of the high-resolution region, the transitional region, and/or the peripheral region can also be determined based on the gaze location confidence level. For example, the high-resolution region and/or the transitional region can be elongated along the direction of motion of the user's gaze, with the amount of elongation being inversely dependent on the confidence level (for example). For example, when the confidence level for the predicted gaze location is relatively low, the high-resolution region and/or the transitional region can have a relatively large elongation along the direction of motion. The elongation can decrease as the confidence level for the predicted gaze location increases (e.g., to a square or circular shape for confidence levels above an upper threshold, or for a current (measured) gaze location). The elongation can be symmetric about the predicted gaze location, or can have an asymmetry (e.g., a constant asymmetry or an asymmetry that is inversely dependent on the confidence level). The size and/or shape of the high-resolution regions (e.g., the foveate region) may dynamically change as the prediction model builds confidence, as described in further detail in connection with, for example FIGS. 13-18.

Prior to rendering, as additional eye-tracking data is obtained, the confidence levels for each predicted gaze location may increase (or decrease), and the size and/or shape of the high-resolution region 430 and transition region 440 for each prediction can be modified accordingly. For example, as the confidence level rises for each of a one-frame predicted gaze location, a three-frame predicted gaze location, and a ten-frame predicted gaze location with incoming eye tracking data, the size of the high-resolution region 430 and the transitional region 440 associated with each prediction can be reduced.

At block 1204, first content of an image frame may be rendered for display in the high-resolution region having the determined location, size, and/or shape (e.g., using display panel 118). The first content in the high-resolution region may be rendered at a relatively high (e.g., foveal) resolution. Second content surrounding the first content may be rendered for display in a transitional region having the determined size and/or shape for the transitional region, and having a resolution that decreases from the high-resolution at the border with the high-resolution region to a lower resolution at a border with a peripheral region. Third content surrounding the second content may be rendered for display at the relatively low resolution in the peripheral region. In this way, foveated display of an image frame may be provided, with a high-resolution region pre-rendered at a future gaze location for the user's eyes, while the user's eyes are in motion to the future gaze location. The rendered foveated display image frame may be stored for later display and/or for update or modification prior to display, and/or may be displayed while the user's eye is moving toward the predicted gaze location. For example, because, once a saccade movement is initiated, the user cannot redirect the saccade, and visual perception during the saccade can be reduced (e.g., because the eye does not perceive high amounts of detail during rapid eye movements or focus shifts), when a saccade movement and an associated future gaze location is identified, the foveated display image frame with the high-resolution region at the predicted future gaze location can be displayed and/or adjusted prior to arrival of the user's eyes at the predicted gaze location. In other circumstances, the foveated display image frame with the high-resolution region at the predicted future gaze location can be pre-rendered and stored for display when the current movement of the eye is complete. In some circumstances, the size of the high-resolution region of a rendered and/or displayed image frame may be increased after rendering (e.g., based on an updated prediction at a new predicted gaze location different than the predicted gaze location, due to a current gaze location different than the predicted gaze location, and/or due to a reduced confidence in a predicted gaze location) to ensure that the user's eyes land in the high-resolution region. In some circumstances, peripheral (low-resolution) region 400 may be rendered first, and the high-resolution region added later based on newly updated eye tracking data.

At block 1206, the size and/or shape of the high-resolution region of a next display frame may be modified relative to that of the rendered and/or displayed image frame. For example, as additional eye tracking data is obtained while the user's eye is still in motion toward the predicted future gaze location of the rendered and/or displayed image frame, a confidence level for the predicted gaze location may increase, thereby allowing the size of the high-resolution region (and/or the surrounding transitional region) to decrease for the next display frame. The shape of the high-resolution region (and/or the surrounding transitional region) may also change (e.g., become more symmetric and/or more circular) with the increasing confidence level as the user's eye approaches the predicted gaze location.

At block 1208, a static, or current, gaze location may be determined. For example, after the user's eye motion is complete, and the user's gaze has landed (at least temporarily) at a static gaze location, the current, static gaze location can be identified using, for example, a latest (most recent) eye tracking data point. The static gaze location may be at or near the predicted future gaze location previously obtained.

At block 1210, because the gaze location of the user is now known (e.g., because the location is static at the most recently measured location), the size of the high-resolution region can be further reduced to a minimum size for the foveated display frames to be displayed while the gaze location is static. As illustrated by the operations of FIG. 12, the predicted gaze locations and corresponding confidence levels allow aspects of the foveated display operations to be performed in advance and/or in parallel with other scene content identification and rendering operations, so that the foveated display image frame can be generated before the user's eye arrives at a new location, thereby reducing the impact of system latency and preventing visual errors or disruptions for the user.

FIGS. 13-18 illustrate various views of display panel 118 during predictive foveated display operations, in accordance with aspects of the disclosure. For example, in FIG. 13, display panel 118 is shown displaying a foveated display image frame 401 for a current static gaze location 317. In the example of FIGS. 13-18, optics block 320 and its optical effects are omitted merely for clarity of the current discussion, but would be understood to be interposed between the user's eye and display panel 118 in device 102.

Figure 13:
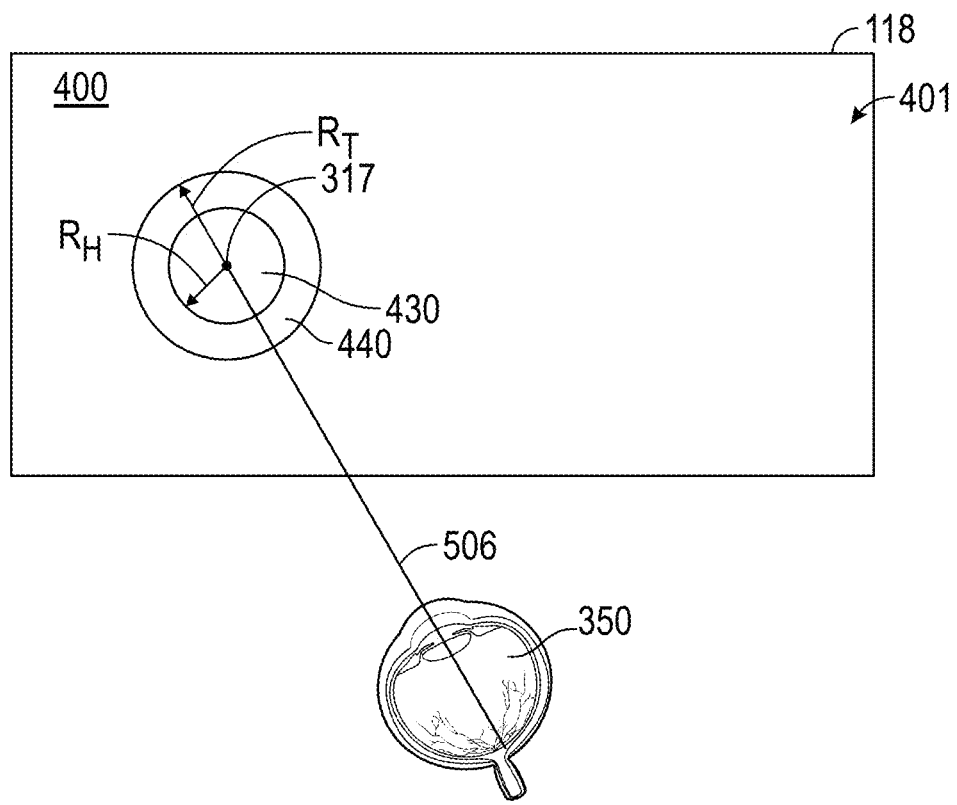
FIGS. 13-16 illustrate various stages of a foveated display operation associated with a detected saccade movement of a user's eye, in accordance with aspects of the disclosure.

In the example of FIG. 13, gaze location 317 is a current, static gaze location based on a most recent measurement of gaze direction 506 from eye tracking units 215 and eye tracking module 710. In this example, high-resolution region 430 and transitional region 440 of foveated display image frame 401 are circular, and have respective widths $R_H$ and $R_T$ (radii in this example) that are minimum widths for these regions in a foveated display operation. Although high-resolution region 430 and transitional region 440 of foveated display image frame 401 are circular in the example of FIG. 13, it should be appreciated that other shapes such as rectangular shapes can be used for high-resolution region 430 and transitional region 440 of foveated display image frame 401.

Figure 14:
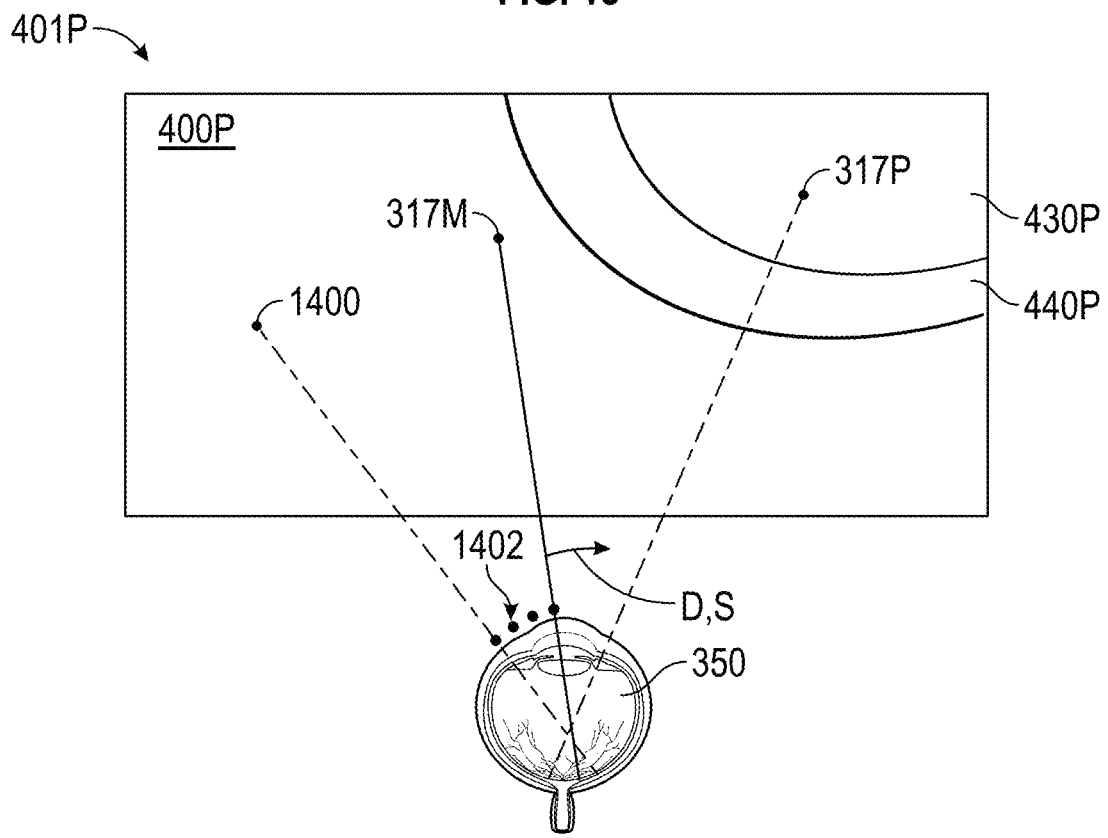

FIG. 14 illustrates an example in which the user's eye 350 has begun a saccade movement from gaze location 317 of FIG. 13 (marked in FIG. 14 as prior gaze location 1400) toward a new, as yet unknown, gaze location. In the example of FIG. 14, eye 350 has a current gaze location 317M that is changing in a direction D with a speed S. The direction D and speed S may be determined based on, for example, eye tracking data points 1402 (e.g., measurements) of the motion of the user's pupil and/or other identified parts of the user's eye. The direction D and speed S can be measured and/or updated with each data point 1402 that is collected. As shown in FIG. 14, based on the direction D and speed S (e.g., one or more measurements thereof associated with the already completed portion of the motion of the eye), a predicted gaze location 317P is generated (e.g., by eye prediction module 722). It should also be appreciated that the eye tracking data points 1402 (e.g., measurements) at various times (e.g., corresponding to the change in the gaze direction of the user's eyes) can be used to generate a predicted gaze location 317P without explicitly outputting a measurement of the speed S or direction D.

As discussed above (see, e.g., FIGS. 9-11) predicted gaze location 317P is generated with a confidence level that can be used to determine the size and shape of high-resolution region 430 and transitional region 440 of an image frame to be displayed at or before the time of arrival of the user's eye at the predicted gaze location. In the example of FIG. 14, a predictive foveated display image frame 401P is displayed with a high-resolution region 430P that is larger than high-resolution region 430 of FIG. 13, and is elongated along the direction of motion of gaze location 317M, due to a relatively low confidence level for predicted gaze location 317P at this stage of the motion of the user's eye. In the example of FIG. 14, transitional region 440P is also larger than transitional region 440 of FIG. 13, and is elongated along the direction of motion of gaze location 317M, due to a relatively low confidence level for predicted gaze location 317P at this stage of the motion of the user's eye. The size and shape of peripheral portion 400P is determined accordingly.

Figure 15:
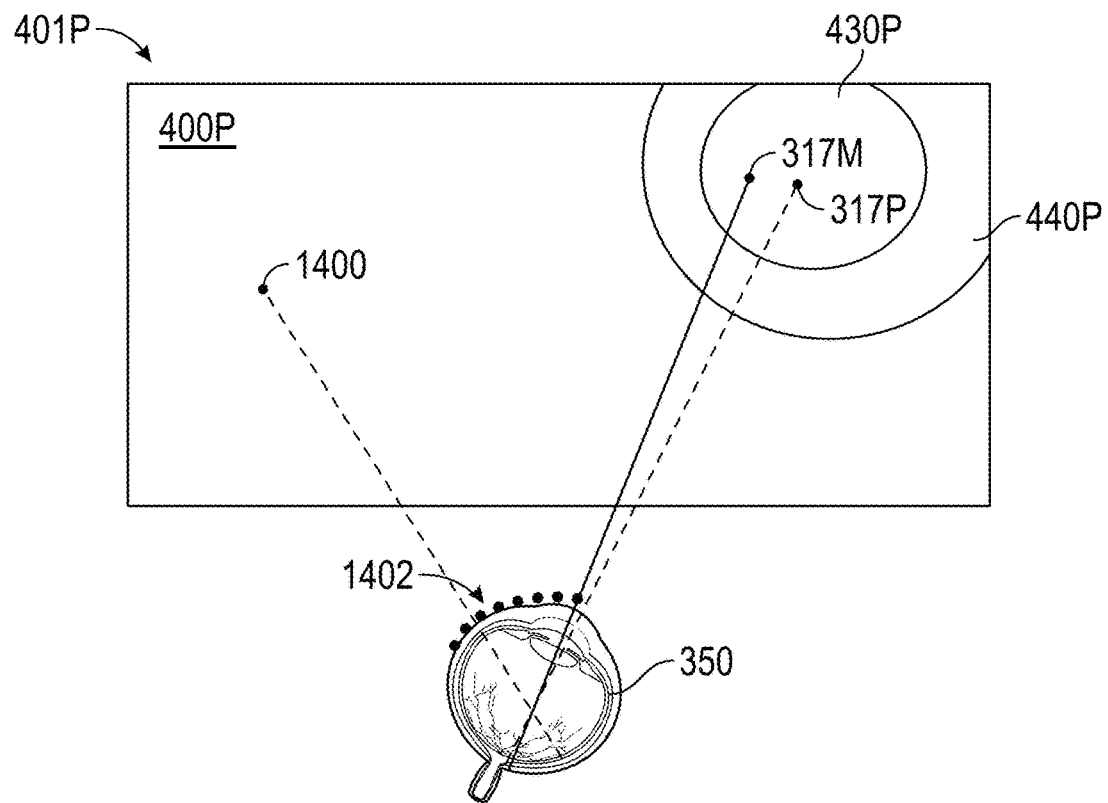

FIG. 15 shows an example in which user's eye 350 has completed most of the saccade motion from prior gaze location 1400 toward predicted gaze location 317P. As shown in FIG. 15, more eye tracking data points 1402 have been obtained, allowing predicted gaze location 317P to be generated with a relatively higher confidence level than the confidence level at the time of FIG. 14. Accordingly, the size of high-resolution region 430P and transitional region 440P are in the image frame displayed at the time of FIG. 15 are reduced relative to the sizes of those regions in the image frame displayed at the time of FIG. 14, and high-resolution region 430P and transitional region 440P have a reduced elongation along the motion of gaze location 317M due to a higher confidence level for the FIG. 15 prediction.

Figure 16:
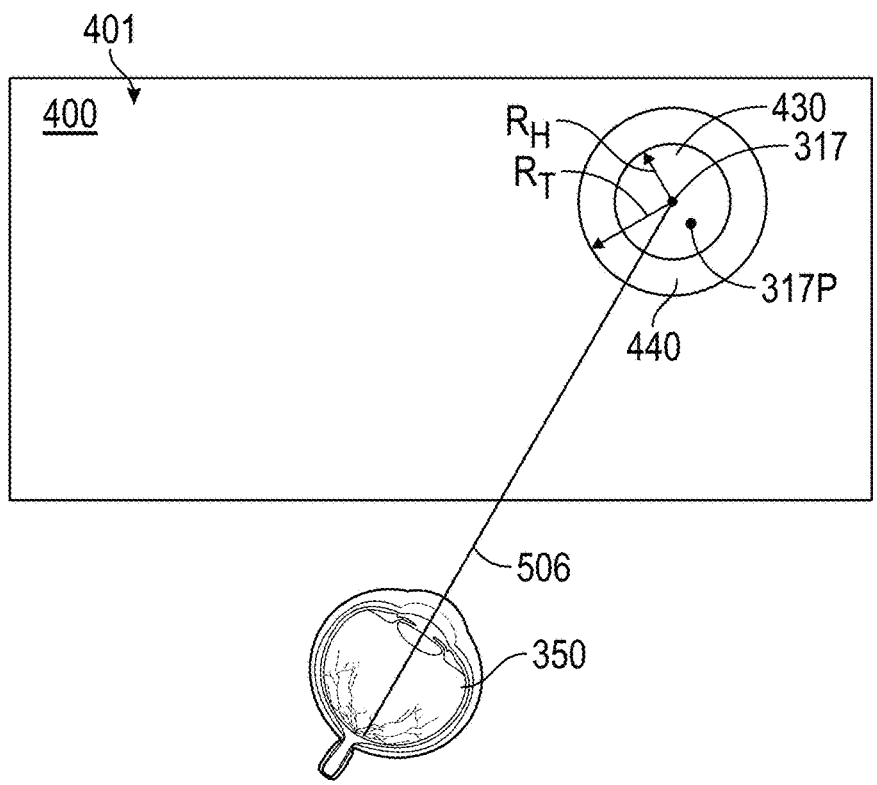

FIG. 16 shows an example in which the saccade movement is complete and the user's gaze direction 506 has landed and is static at a new gaze location 317. In this example, the new gaze location 317 is close to, but not exactly at, the location of the prior predicted gaze location 317P. In this example, because the gaze location 317 is once again static, the high-resolution region 430 and transitional region 440 are symmetric (e.g., circular in this illustrative example), concentric, and have minimum widths $R_H$ and $R_T$ respectively.

Figure 17:
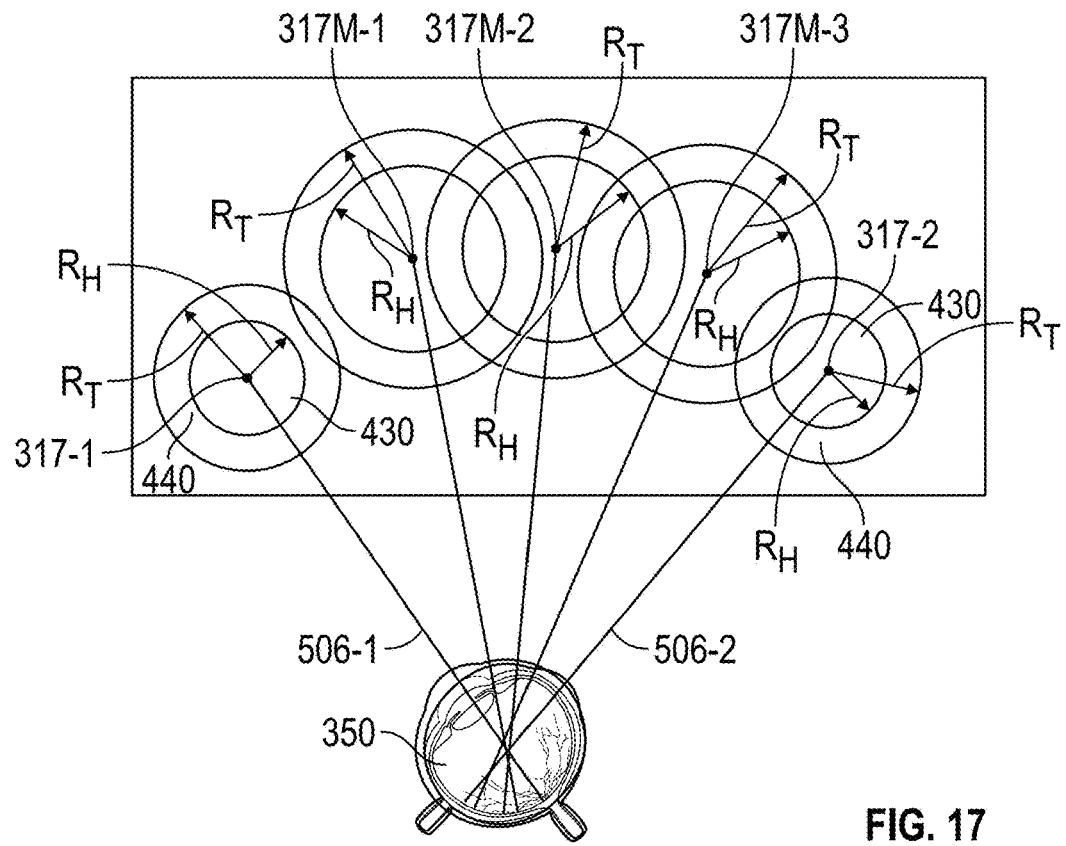
FIG. 17 illustrates various stages of a foveated display operation associated with a detected smooth pursuit movement of a user's eye, in accordance with aspects of the disclosure.

FIG. 17 illustrates display panel 118 during predictive foveated display operations during smooth pursuit movement of a user's eye, in accordance with aspects of the disclosure. For example, in FIG. 17, display panel 118 is illustrated displaying foveated display image frames as the user's gaze location is changed to perform a smooth pursuit motion from a first static gaze location 317-1 to a second static gaze location 317-2, moving through intermediate gaze locations 317M-1, 317M-2, and 317M-3. In the example of FIG. 17, gaze locations 317-1 and 317-2 are each a current, static gaze location based on a most recent measurement of gaze direction 506-1 and 506-2 from eye tracking units 215 and eye tracking module 710. Accordingly, high-resolution region 430 and transitional region 440 of foveated display image frame 401 have respective widths $R_H$ and $R_T$ (e.g., radii in the example of FIG. 17) that are minimum widths for these regions in a foveated display operation before and after the smooth pursuit motion of the user's eye.

As illustrated in FIG. 17, when smooth pursuit motion is detected, because the motion of the user's eye is slower than in the saccade movement illustrated in FIGS. 13-16, and may be predictable with a higher confidence level (e.g., particularly, if known display content corresponding to known motion of a display object can be associated with the pursuit), regions 430 and 440 around moving and/or predicted gaze locations such as gaze locations 317M of FIG. 17 may maintain a constant shape and may increase in size (e.g., width or radius) in the image frames based on predictions (e.g., based on the confidence level of a predicted gaze location), relative to the minimum $R_H$ and $R_T$ for image frames for known gaze locations, but less than the increase used for a saccade movement.

Figure 18:
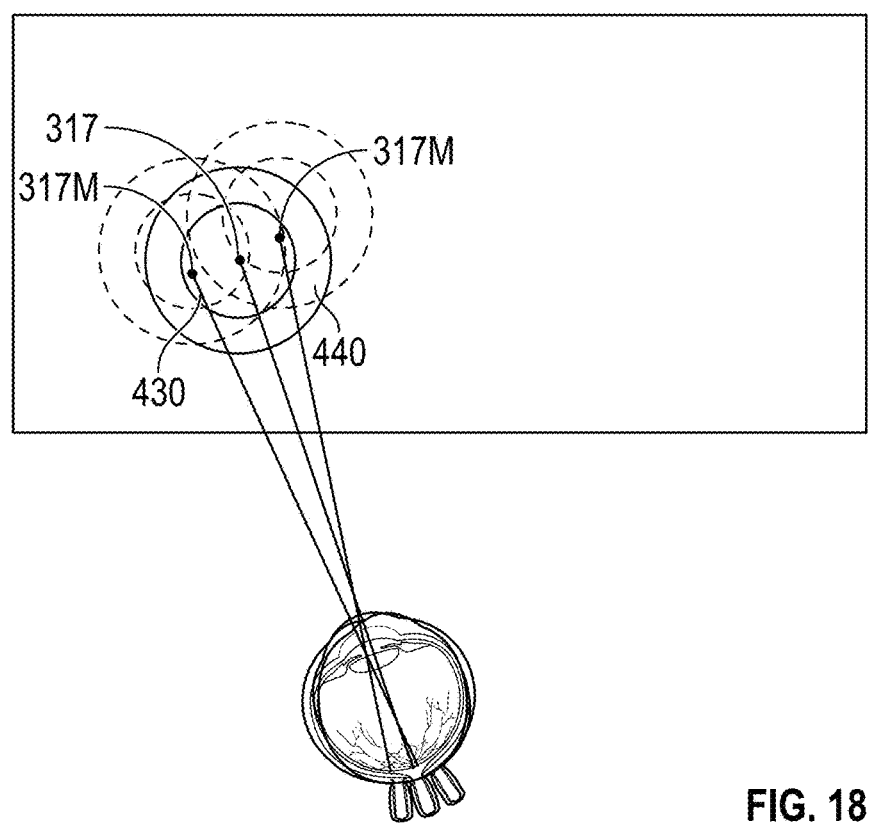
FIG. 18 illustrates various stages of a foveated display operation associated with a detected vestibulo-ocular movement of a user's eye, in accordance with aspects of the disclosure.

FIG. 18 illustrates display panel 118 during predictive foveated display operations during vestibulo-ocular movement of a user's eye, in accordance with aspects of the disclosure. For example, in FIG. 18, display panel 118 is shown displaying foveated display image frames as the user's static gaze location performs a vestibulo-ocular movement to various moving gaze locations 317M around a static gaze location 317. When the motion of the user's eye is determined to be vestibulo-ocular, and primarily for stabilization due to head and/or body movement, the size and shape of high-resolution region 430 and transitional region 440 can be maintained at the minimum width even as the small motions of the user's gaze location are predicted, for low-latency rendering. However, in some scenarios, the size and/or shape of high-resolution region and/or transition region 440 can also be modified (e.g., increased) during vestibulo-ocular movements, based on gaze prediction confidence levels.

It should be appreciated that the size and shape of regions 430 and 440 depicted in FIGS. 13-18 are merely illustrative, and other sizes and/or shapes for regions 430 and/or 440 can be determined, based on the type of eye movement, the predicted gaze location, and/or the confidence level for the predicted gaze location.

Example Variable Focus Display Systems and Methods

Figure 19:
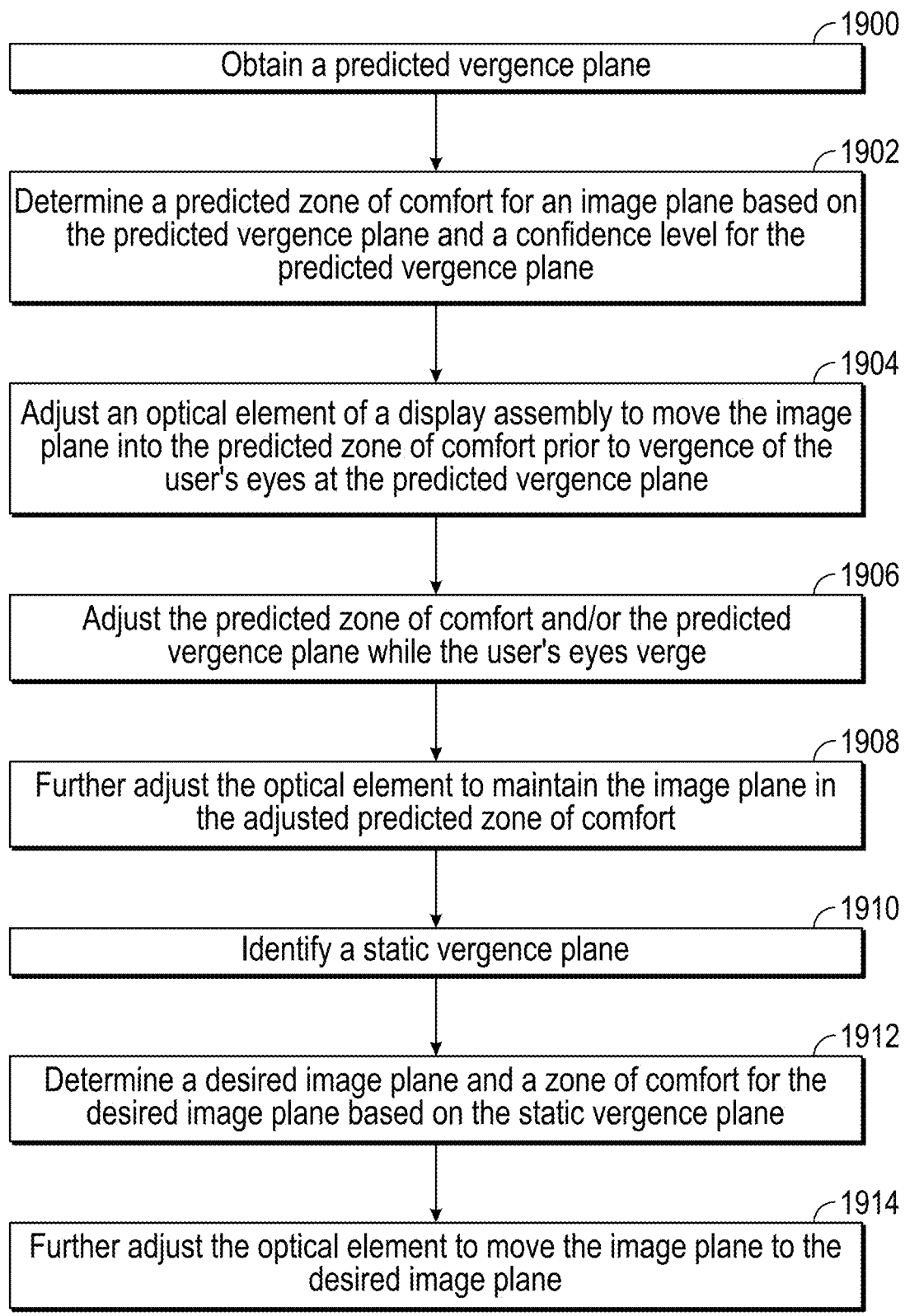
FIG. 19 illustrates a flow chart of illustrative operations that may be performed for predictive variable focus display, in accordance with aspects of the disclosure.

FIG. 19 illustrates a flow diagram of an example process for predictive variable focus display, in accordance with one or more implementations. For explanatory purposes, the process of FIG. 19 is primarily described herein with reference to one or more devices of FIGS. 1, 2 and 5-8 (particularly with reference to head-mountable display device 102, eye tracking units 215, eye tracking module 710, eye prediction module 722, vergence processing module 712, varifocal actuation block 706, display assembly 360, and display panel 110), some of which may be executed by one or more processors of head-mountable device 102 of FIG. 1. However, the process of FIG. 19 is not limited to these devices and/or modules, and one or more blocks (or operations) of the process may be performed by one or more other components of other suitable devices. Further for explanatory purposes, the blocks of the process of FIG. 19 are described herein as occurring in series, or linearly. However, multiple blocks of the process of FIG. 19 may occur in parallel. In addition, the blocks of the process of FIG. 19 need not be performed in the order shown and/or one or more blocks of the process of FIG. 19 need not be performed and/or can be replaced by other operations.

At block 1900, one or more predicted vergence planes are obtained. The predicted vergence plane(s) may be obtained from, for example, eye prediction module 722 based on the operations of, for example, FIG. 10 or 11. The predicted vergence planes may include a 10 ms prediction, a 30 ms prediction, and a 100 ms prediction, respectively, for prediction times that are 10 ms, 30 ms, and 100 ms from the current time. For example, for vergence plane predictions, varifocal actuation block 706 may have a known maximum adjustment time (e.g., in ms). The prediction times may be future times that are based on (e.g., one or more multiples of) a known latency time in the varifocal actuation block 706. As another example, the predicted vergence planes may include a one-frame prediction, a three-frame prediction, and a ten-frame prediction (as examples) corresponding to prediction times one frame, three frames, or ten frames in the future from a currently displayed frame. Each predicted vergence plane has an associated confidence level that can also be obtained.

At block 1902, a predicted zone of comfort for an image plane of the optical system of display assembly 360 is determined, based on the predicted vergence plane and a confidence level for the predicted vergence plane. The predicted zone of comfort may be a range within which, although the image plane of the optical system may not be the same as the vergence depth or virtual object depth, the difference between the image plane and the vergence depth remains comfortable for the user. The predicted zone of comfort for the image plane may be a zone within, for example, 1.5 diopters of the vergence plane. In some operational scenarios, the predicted zone of comfort that is determined at block 1902 may be determined based on both the comfort of the user viewing a predicted vergence plane, and a confidence level for a predicted vergence plane. For example, the size of the predicted zone of comfort may be increased relative to a minimum comfort size, when the confidence level for the predicted plane is less than a threshold value. In this way, the system can avoid overly aggressive alterations of the optical system of display assembly 360 based on low-confidence vergence predictions.

At block 1904, one or more optical elements (e.g., one or more of lenses 104 and/or display panel 118) may be adjusted to move the image plane into the predicted zone of comfort. Adjusting the optical element(s) may include moving and/or deforming one or more of lenses 104 (e.g., as discussed above in connection with FIGS. 5 and 6), moving and/or deforming one or more other elements of display assembly 360 (e.g., by moving display panel 118), tuning a liquid tunable lens, moving one or more components of one or more Alvarez lenses, and/or modifying the polarization of the display light passing through one or more Pancharatnam-Berry phase (PBP) lenses (as examples). The one or more optical elements may be adjusted, for example, prior to vergence of the user's eyes at the predicted vergence plane (e.g., during the vergence movement of the user's eyes). The image plane may be adjusted, at block 1904, to an undershoot edge of the predicted zone of comfort. The undershoot edge of the predicted zone of comfort is the edge of the predicted zone of comfort that is closest to the current image plane. In this way, the adjustment of the optical elements prior to landing of the user's eyes at a new vergence plane is reduced. The adjustment of the optical elements to the undershoot edge of the predicted zone of comfort during a vergence movement of the user's eyes may be a gross adjustment, and may be performed at a gross adjustment rate.

At block 1906, the predicted zone of comfort and/or the predicted vergence plane can be adjusted while the user's eyes verge (e.g., converge or diverge) toward the new vergence plane. For example, as additional eye tracking data points are obtained from eye tracking module 710, updated predicted vergence planes and predicted zones of comfort can be generated with increasing confidence levels.

At block 1908, the one or more optical elements may be further adjusted, still prior to vergence of the user's eyes at the predicted vergence plane. The further adjustment may be made, for example, to maintain the image plane within the adjusted predicted zone of comfort, and may be made at a second (e.g., slower) adjustment rate.

At block 1910, a static, or current, vergence plane may be determined. For example, after the user's vergence motion is complete, and the user's gaze has landed (at least temporarily) at a static vergence depth, the current, static vergence plane can be identified using, for example, a latest (most recent) eye tracking data point for the gaze direction of each eye. The static vergence plane may be at or near the predicted future vergence plane previously obtained.

At block 1912, because the vergence plane of the user is now known (e.g., because the plane is static at the most recently measured vergence depth), a desired image plane and a corresponding desired zone of comfort for the current vergence plane can be identified (e.g., within 1.5 diopters of the current vergence plane).

At block 1914, the one or more optical elements may be further adjusted to move the image plane to the desired image plane. Because of the previous predictive adjustment of the one or more optical elements at blocks 1904 and/or 1908, in which the optical element(s) were predictively moved based on the predicted vergence plane (to move the image plane in the direction of the current vergence plane), before the user's eyes verged at the current vergence plane, the adjustment at block 1914 may be a fine-tuning adjustment that can be performed at, for example, a third, relatively slower adjustment rate.

Figure 20:
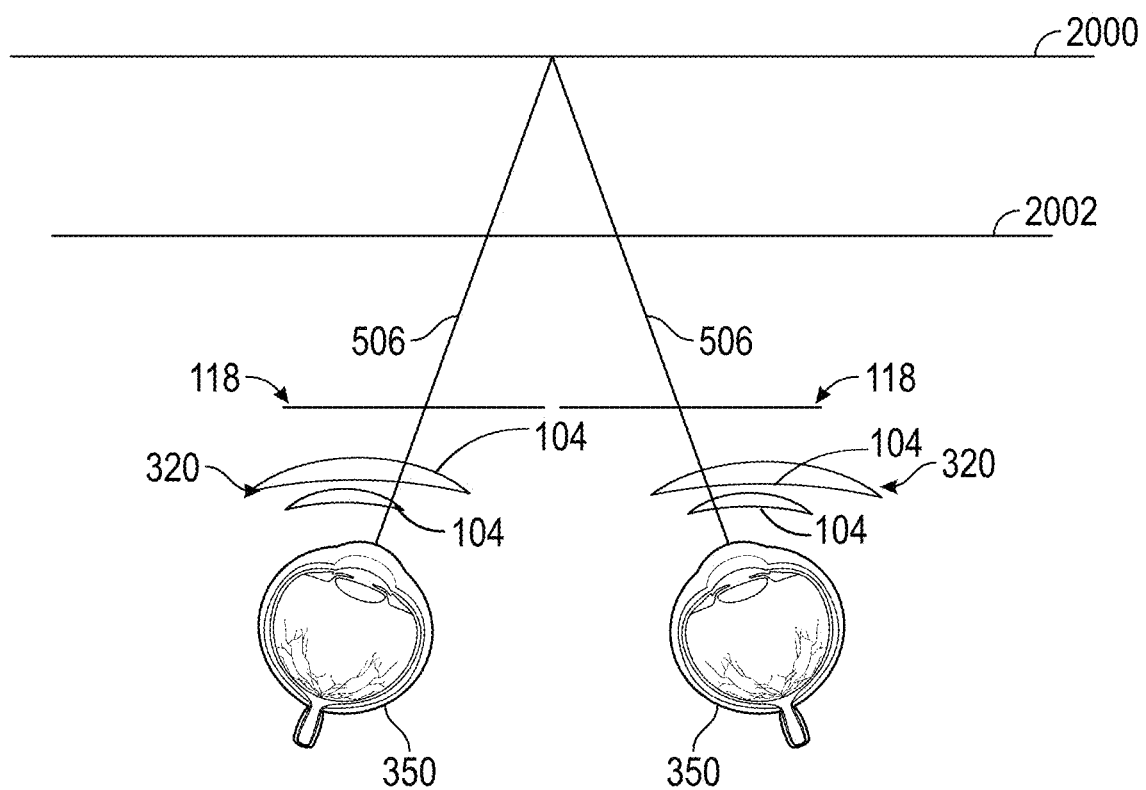
FIGS. 20-23 illustrate various stages of a variable focus display operation associated with a detected vergence movement of a user's eye, in accordance with aspects of the disclosure.

FIGS. 20-23 illustrate various views of display assembly 360 during predictive variable focus display operations, in accordance with aspects of the disclosure. For example, in FIG. 20, display panel 118 displays a virtual object (not shown) on which the user's eyes 350 are verged at a vergence plane 2000. In the example of FIG. 20, vergence plane 2000 is a current, static vergence plane which is known based on a most recent measurement of the gaze directions 506 for each eye 350 from eye tracking units 215 and eye tracking module 710.

In the example of FIG. 20, lenses 104 of optical block 320 are arranged to form an image of display panel 118 at an image plane 2002. As illustrated in FIG. 20, the image plane 2002 at which the user focuses on the image of display panel 118 may not be the same as the vergence plane 2000 at which the user's eyes verge on a particular virtual object being displayed.

Figure 21:
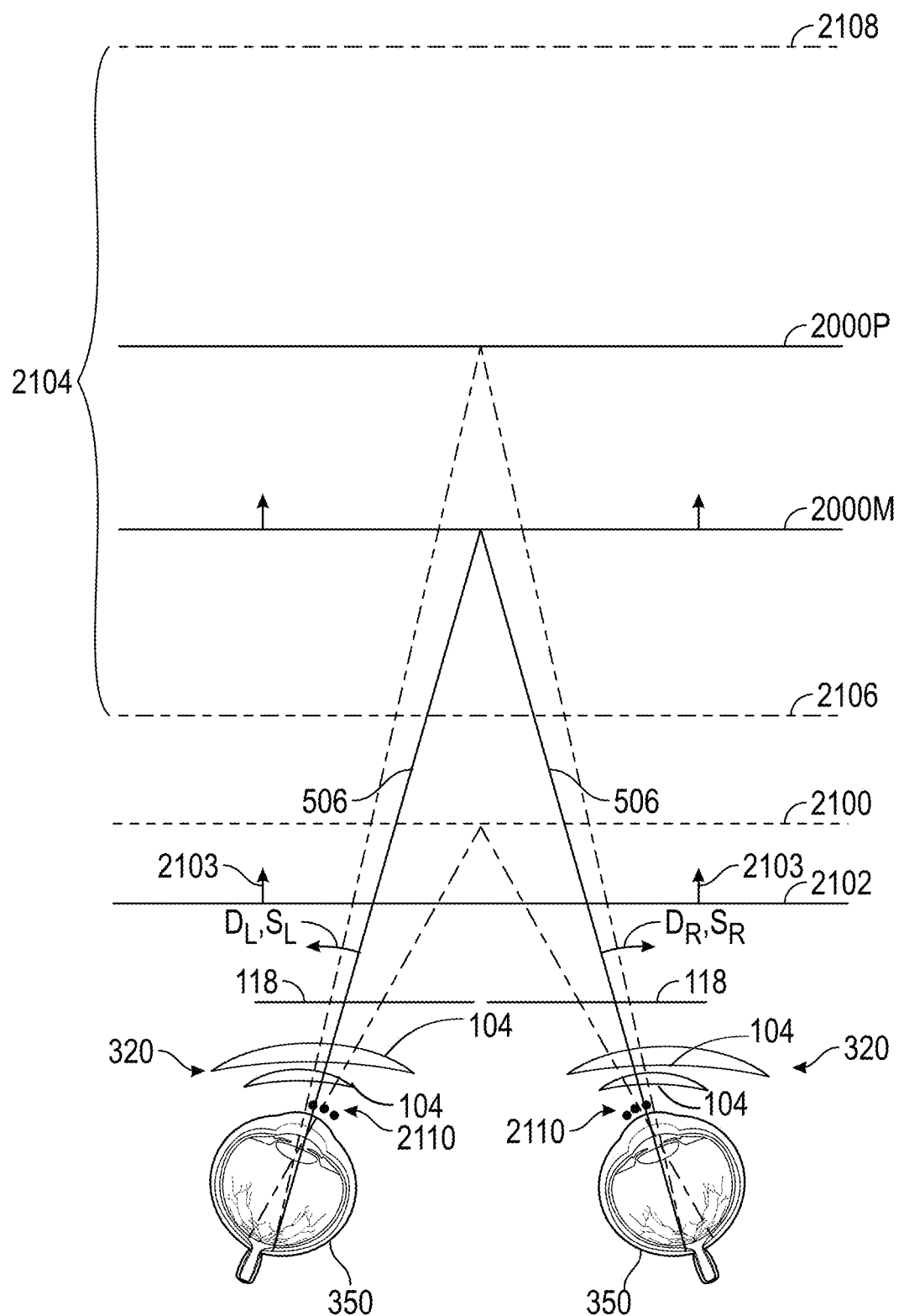

FIG. 21 illustrates an example in which the user's eyes have begun diverging from the prior static vergence plane (indicated in FIG. 21 as prior vergence plane 2100) toward a new, as yet unreached, vergence plane. For example, eye tracking measurements 2110 may indicate that the user's two eyes are rotating away from each other. A direction $D_R$ and speed $S_R$ of the motion of the user's right eye and a direction $D_L$ and speed $S_L$ of the motion of the user's left eye (or eye tracking data points over time without explicitly calculating or outputting a speed or direction) can be used to generate a predicted vergence plane 2000P, even as the gaze directions 506 currently intersect at an intermediate vergence plane 2000M. As illustrated by arrows 2103 in FIG. 21, based on the predicted vergence plane 2000P, adjustments of optical block 320 and/or display panel 118 have begun to move the image plane 2102 toward the predicted vergence plane, to cause an accommodation of the user's eyes 350 in accordance with the ongoing vergence change.

For example, to move image plane 2102 in the direction of arrows 2103, the position and/or shape of an optical element such as front optical element 604 or back optical element 606 (see, e.g., FIG. 6) may be adjusted to move the image plane into a zone of comfort 2104 that has been identified for the predicted vergence plane 2000P. As illustrated in FIG. 21, zone of comfort 2104 may include an undershoot edge 2106 and an overshoot edge 2108. The elements of display assembly 360 may be moved and/or deformed, during the vergence movement of eyes 350, to move the image plane 2102 to a depth that is at or near the undershoot edge 2106 of the zone of comfort 2104. As shown, undershoot edge 2106 is an edge of zone of comfort 2104 that is nearest to the current image plane 2102.

Figure 22:
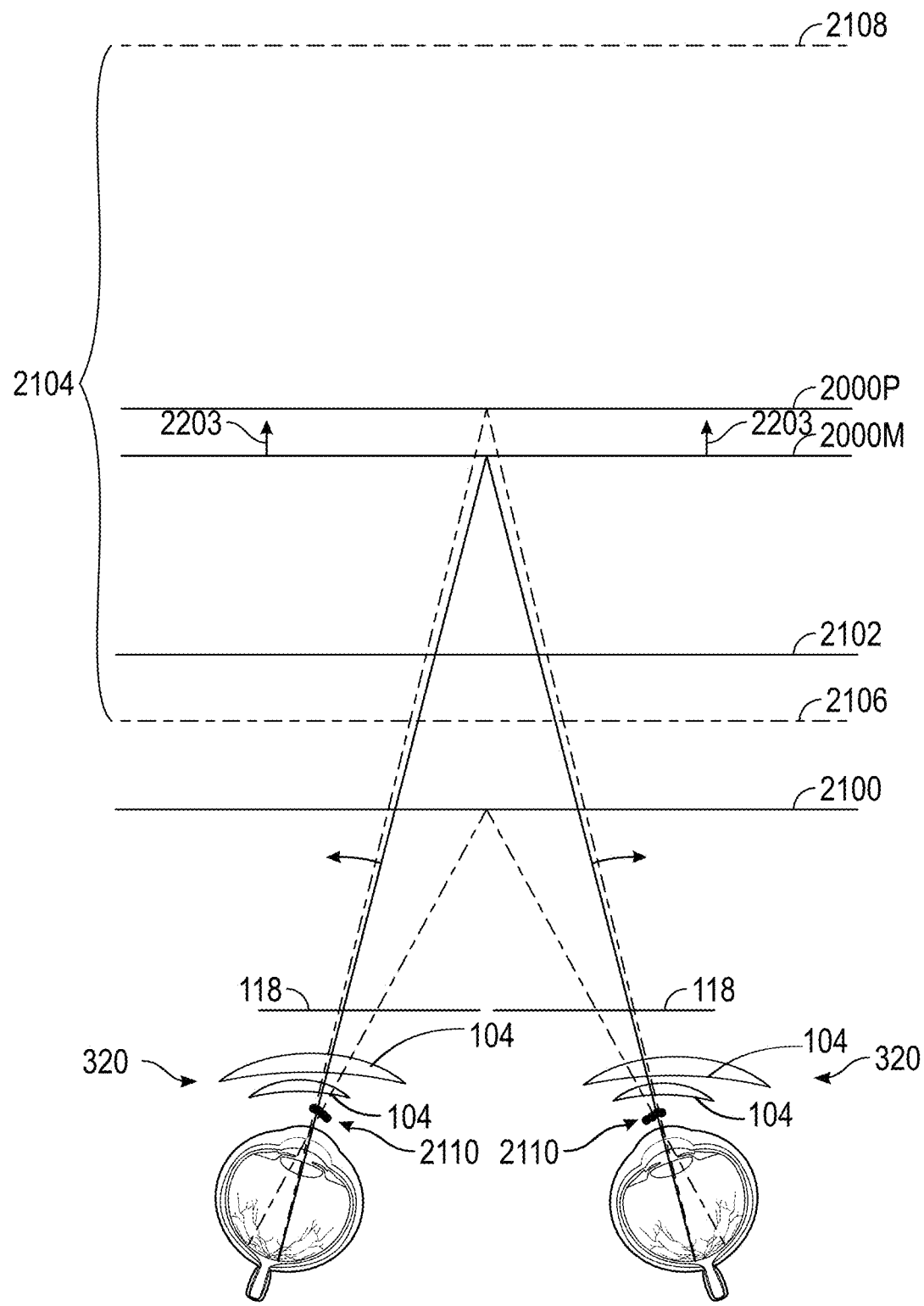

FIG. 22 illustrates an example in which the current vergence plane 2000M has moved further toward the predicted vergence plane 2000P, since a time corresponding to FIG. 21, and is continuing to move as indicated by arrows 2203. As shown in FIG. 22, image plane 2102 has moved to within zone of comfort 2104, just within the undershoot edge 2106. As indicated in FIG. 22, as the motion of user's eyes 350 has continued, additional eye tracking data points 2110 have been obtained. Predicted vergence plane 2000P, a confidence level for the predicted vergence plane 2000P, and/or the undershoot edge 2106 and/or overshoot edge 2108 may be adjusted based on the additional eye tracking data points 2110.

Figure 23:
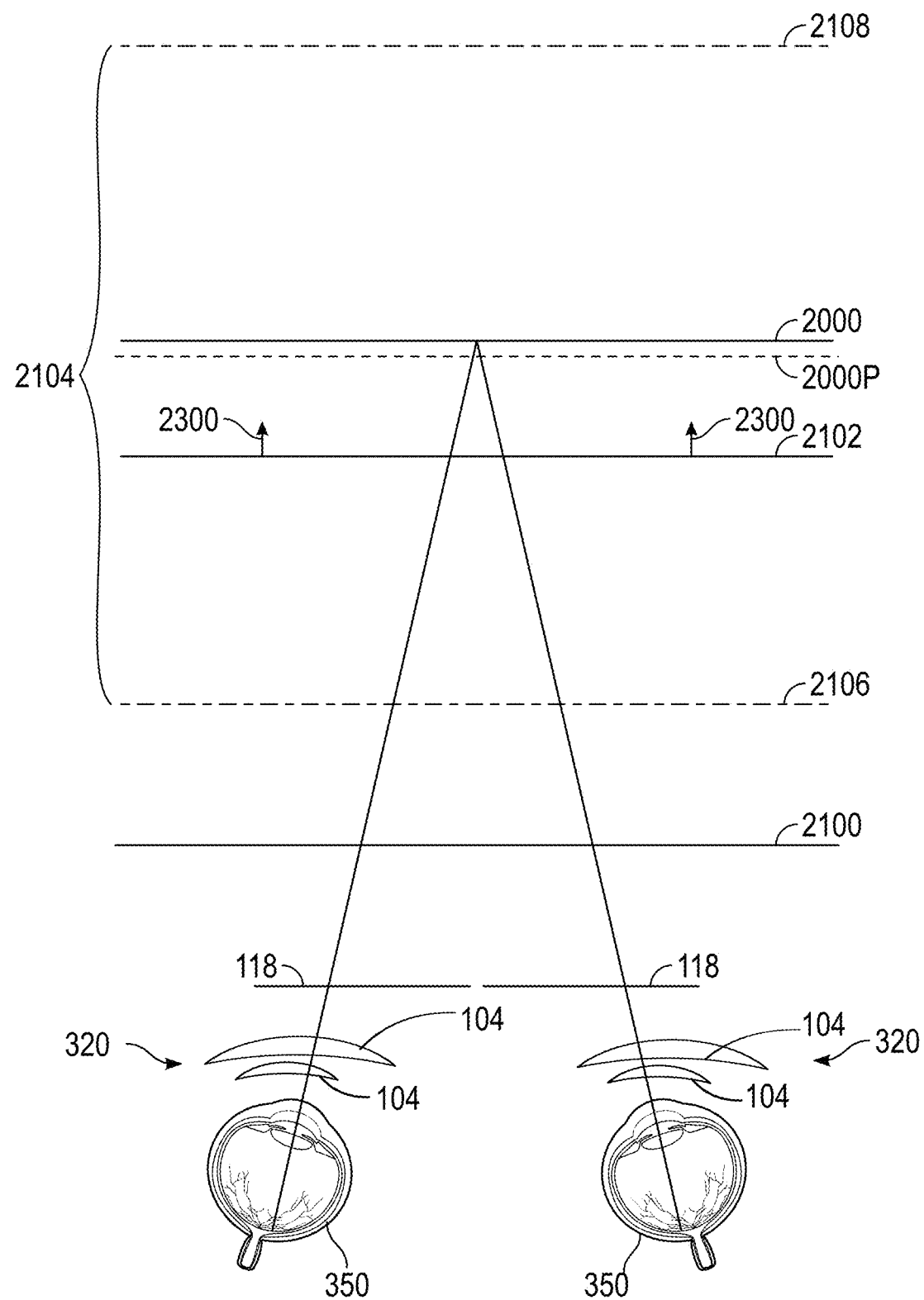

In the example of FIG. 23, the user's eyes 350 have settled, and are static, at a new vergence plane 2000. As indicated, the new vergence plane 2000 may be at or near the previously predicted vergence plane 2000P (e.g., depending on the accuracy of the prediction). As indicated by arrows 2300 in FIG. 23, after the static vergence plane 2000 has been detected, additional (e.g., fine-tuning) adjustments of the image plane 2102 can continue to be made, to further enhance the comfort of the user. The fine-tuning adjustments indicated in FIG. 23 may be performed, for example, at a fine-tuning adjustment rate that is slower than the gross adjustment rate performed during the vergence movement of the user's eyes.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A head-mountable display system, comprising:
a head-mountable display device, comprising:
a housing;
a display panel within the housing; and
one or more eye tracking units configured to obtain eye tracking data;
an eye tracking module configured to identify a change in a current gaze location, based on the eye tracking data;
an eye prediction module configured to generate a predicted future gaze location based on the change; and
processing circuitry configured to render, for display by the display panel, a predictive foveated display image frame based on the predicted future gaze location, wherein the predictive foveated display image frame comprises a high-resolution portion and a transitional resolution portion having a size inversely dependent on a confidence level of the predicted future gaze location.

2. The head-mountable display system of claim 1, wherein:
the display panel is configured to display, while the processing circuitry renders the predictive foveated display image frame, a current foveated display image frame based on the current gaze location.

3. The head-mountable display system of claim 2, wherein the current gaze location and the predicted future gaze location are locations on the display panel.

4. The head-mountable display system of claim 1, wherein the eye prediction module is further configured to generate a predictive gaze location confidence level for the predicted future gaze location a selected number of frames after a current display image frame.

5. The head-mountable display system of claim 4, wherein the processing circuitry is configured to determine a size of the high-resolution portion of the predictive foveated display image frame based on the predictive gaze location confidence level.

6. The head-mountable display system of claim 1, wherein the processing circuitry is configured to determine an elongated shape of the high-resolution portion of the predictive foveated display image frame based on a direction of motion of the current gaze location.

7. The head-mountable display system of claim 1, wherein the processing circuitry is configured to determine a symmetric shape of the high-resolution portion of the predictive foveated display image frame when the current gaze location is static.

8. The head-mountable display system of claim 4, wherein the eye prediction module is configured to generate the predicted future gaze location based on the change by:
identifying a type of eye movement based on the change; and
generating the predicted future gaze location and the predictive gaze location confidence level based on the change and based on a model of the type of eye movement.

9. The head-mountable display system of claim 8, wherein the type of eye movement is a saccade movement, a smooth-pursuit movement, or a vestibulo-ocular movement.

10. The head-mountable display system of claim 1, wherein:
the eye prediction module is configured to generate first, second, and third predicted future gaze locations based on the change; and
the processing circuitry is configured to pre-render corresponding first, second, and third predictive foveated display image frames based on the first, second, and third predicted future gaze locations.

11. The head-mountable display system of claim 10, wherein the first, second, and third predicted future gaze locations correspond to times associated with future display frames that are, respectively, one, three, and ten display frames from a current display frame.

12. The head-mountable display system of claim 1, further comprising a console that is communicatively coupled to the head-mountable display device, wherein the processing circuitry comprises an artificial reality engine of the console.

13. The head-mountable display system of claim 1, wherein the processing circuitry comprises a scene rendering module of the head-mountable display device.

14. A method, comprising:
obtaining eye tracking data for a user of a head-mountable display device having a display panel;
determining a current gaze location and a current direction and speed of a change in the current gaze location, based on the eye tracking data;
generating a predicted future gaze location based on the current direction and speed;
determining a confidence level of the predicted future gaze location;
rendering, for display by the display panel, a current foveated display image frame based on the current gaze location; and
pre-rendering, for display by the display panel subsequent to display of the current foveated display image frame, at least one predictive foveated display image frame based on the predicted future gaze location and the confidence level of the predictive future gaze location, wherein the current foveated display image frame comprises a high-resolution portion and a transitional resolution portion having a size inversely dependent on the confidence level of the predicted future gaze location.

15. The method of claim 14, further comprising generating a predicted future vergence plane based on the current direction and speed.

16. The method of claim 15, further comprising, while displaying the current foveated display image frame, modifying an optical element that is aligned with the display panel, based on the predicted future vergence plane.

17. A method of operating a head-mountable display system having a head-mountable display device that includes a display panel, an optical block configured to focus display light from the display panel, the method comprising:
obtaining, with an eye prediction module, from a left eye tracking unit, and from a right eye tracking unit, an eye tracking data;
determining, with the eye prediction module, using the eye tracking data, an eye movement;
generating at least one of a predicted future gaze location or a predicted future vergence plane, based on the eye movement; and
generating for display in the display panel, an image comprising a high resolution portion and a transitional resolution portion having a size inversely dependent on a confidence level of the predicted future gaze location, and an image plane located in a zone of comfort based on the predicted future vergence plane.

18. The method of claim 17, wherein determining an eye movement comprises identifying a saccade movement, a smooth-pursuit movement, or a vestibulo-ocular movement, and wherein generating at least one of the predicted future gaze location or the predicted future vergence plane comprises generating the predicted future gaze location.

19. The method of claim 17, wherein determining an eye movement comprises identifying a vergence movement, and wherein generating at least one of the predicted future gaze location or the predicted future vergence plane comprises generating the predicted future vergence plane.

20. The method of claim 17, wherein obtaining an eye tracking data comprises receiving a tracking data from the eye prediction module in the head-mountable display device.

* * * * *